(12) United States Patent
Usaj et al.

(10) Patent No.: US 12,355,501 B2
(45) Date of Patent: Jul. 8, 2025

(54) APPARATUS, ARTICLES OF MANUFACTURE, AND METHODS TO SELF-TEST WIRELESS NETWORKING DEVICES

(71) Applicant: The Nielsen Company (US), LLC, New York, NY (US)

(72) Inventors: Marko Usaj, Izola (SI); Kristjan Bogdan, Divača (SI); Peter Sik, Izola (SI); Andrej Barbis, Ilirska Bistrica (SI); Marko Panger, Plavje (SI)

(73) Assignee: The Nielsen Company (US), LLC, New York, NY (US)

( * ) Notice: Subject to any disclaimer, the term of this patent is extended or adjusted under 35 U.S.C. 154(b) by 303 days.

(21) Appl. No.: 17/895,756

(22) Filed: Aug. 25, 2022

(65) Prior Publication Data
US 2023/0318720 A1 Oct. 5, 2023

Related U.S. Application Data

(60) Provisional application No. 63/319,747, filed on Mar. 14, 2022.

(51) Int. Cl.
*H04B 17/00* (2015.01)
*H04B 17/17* (2015.01)
*H04B 17/19* (2015.01)
*H04B 17/327* (2015.01)

(52) U.S. Cl.
CPC ............. *H04B 17/19* (2015.01); *H04B 17/17* (2015.01); *H04B 17/327* (2015.01)

(58) Field of Classification Search
CPC ............. H04L 25/028; H04L 25/03343; H04L 25/061; H04L 65/80; H04B 17/318; H04B 2001/0416; H04B 17/309; H04B 1/1027; H04B 10/50; H04B 10/506; H04B 10/06
See application file for complete search history.

(56) References Cited

U.S. PATENT DOCUMENTS

| | | | |
|---|---|---|---|
| 9,742,481 B1* | 8/2017 | Jorgovanovic | H04B 7/082 |
| 2009/0198459 A1* | 8/2009 | Bilac | H02H 3/33 |
| | | | 702/58 |
| 2015/0003344 A1* | 1/2015 | Suwa | H04L 27/0006 |
| | | | 370/329 |
| 2021/0067265 A1* | 3/2021 | Agarwal | H04K 3/224 |
| 2022/0393746 A1* | 12/2022 | Zhou | H04W 76/19 |
| 2023/0033659 A1* | 2/2023 | Lee | H04H 60/31 |
| 2023/0050564 A1* | 2/2023 | Saloni | H04W 24/04 |
| 2024/0179681 A1* | 5/2024 | Guo | H04W 72/0446 |

* cited by examiner

*Primary Examiner* — Sai Aung

(57) ABSTRACT

Methods, apparatus, systems, and articles of manufacture are disclosed to perform a self-test of a wireless networking device. Examples disclosed herein include communication controller circuitry to cause the first WNIC to obtain a plurality of data packets from a second WNIC at a frequency. Examples herein further include signal strength determination circuitry to determine a received signal strength indicator (RSSI) value for an antenna of the first WNIC. Examples herein further include performance determination circuitry to increment a counter associated with the antenna when the RSSI value does not satisfy a first threshold and report an error associated with the antenna to a back office facility when the counter associated with the antenna does not satisfy a second threshold.

18 Claims, 9 Drawing Sheets

APPARATUS, ARTICLES OF MANUFACTURE, AND METHODS TO SELF-TEST WIRELESS NETWORKING DEVICES

RELATED APPLICATION

This patent claims the benefit of U.S. Provisional Patent Application No. 63,319,747, which was filed on Mar. 14, 2022. U.S. Provisional Patent Application No. 63,319,747 is hereby incorporated herein by reference in its entirety. Priority to U.S. Provisional Patent Application No. 63,319,747 is hereby claimed.

FIELD OF THE DISCLOSURE

This disclosure relates generally to wireless networking devices and, more particularly, to apparatus, articles of manufacture, and methods to self-test wireless networking devices.

BACKGROUND

In recent years, some wireless networking devices (e.g., streaming meter devices) are used to measure audience tuning and ratings for online media such as streaming content (e.g., films, television series, online videos, advertisements, etc.). Some wireless networking devices include multiple wireless network interface controllers (WNICs) (e.g., WNICs, Bluetooth cards, etc.) with one or more antennas to connect to a wireless router (e.g., Wi-Fi router, Wi-Fi extender, access point, etc.) in a household and presentation device(s) (e.g., Smart television (TV), laptop, mobile device(s), etc.) streaming the content. The wireless networking devices may read metadata of the detected content to identify the platform (e.g., application, website, etc.), the title, the type (e.g., video, audio, game, etc.), etc. associated with the streamed content. In the wireless networking devices, antennas are connected to the WNICs, and the WNICs are connected to a printed circuit board (PCB) via wired connections and/or soldering.

Figure 1:
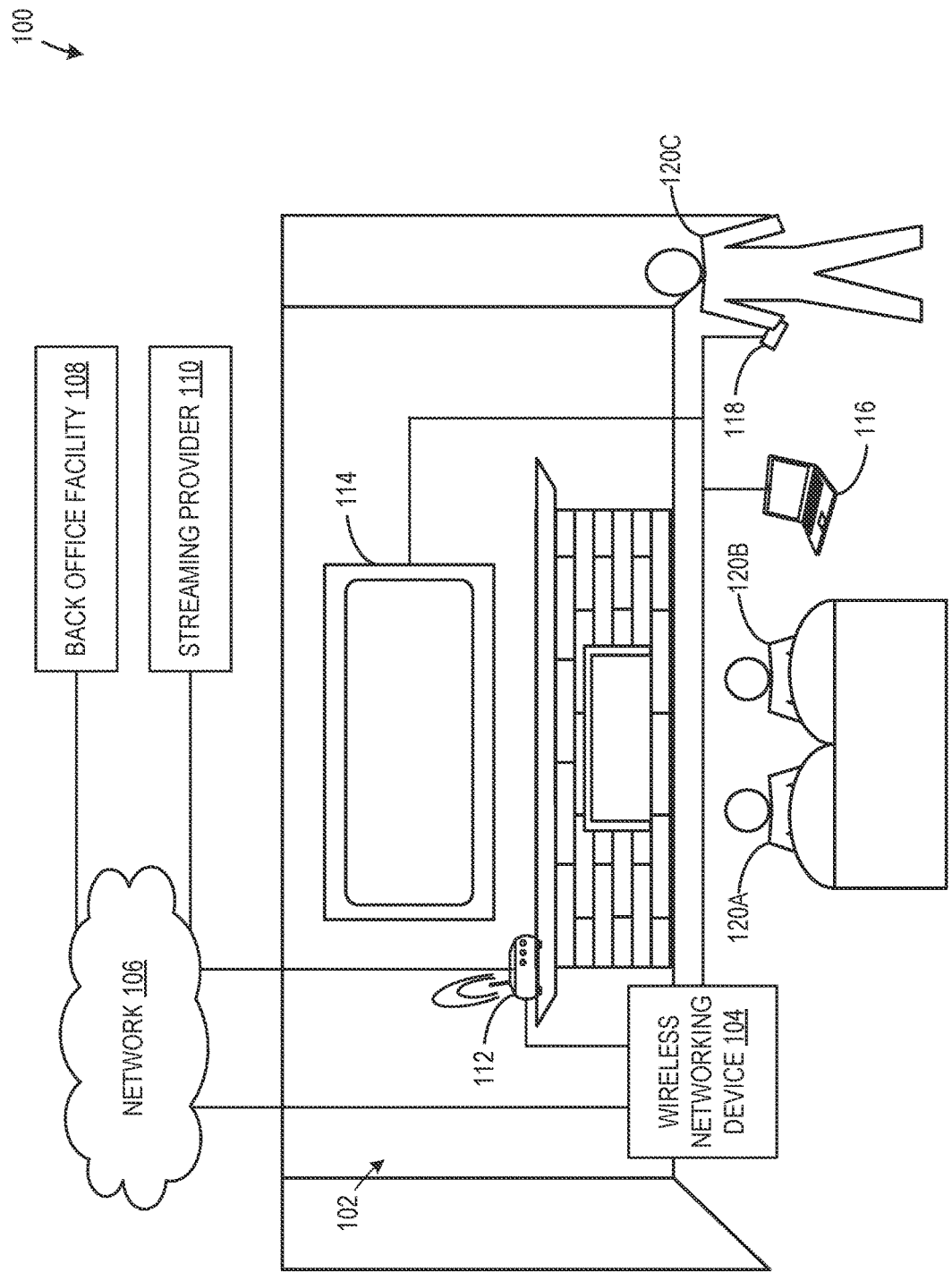
FIG. 1 is a schematic illustration of an example first system for monitoring streaming content.

In general, the same reference numbers will be used throughout the drawing(s) and accompanying written description to refer to the same or like parts. The figures are not to scale. Instead, the thickness of the layers or regions may be enlarged in the drawings. Although the figures show layers and regions with clean lines and boundaries, some or all of these lines and/or boundaries may be idealized. In reality, the boundaries and/or lines may be unobservable, blended, and/or irregular.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name.

As used herein, "approximately" and "about" modify their subjects/values to recognize the potential presence of variations that occur in real world applications. For example, "approximately" and "about" may modify dimensions that may not be exact due to manufacturing tolerances and/or other real world imperfections as will be understood by persons of ordinary skill in the art. For example, "approximately" and "about" may indicate such dimensions may be within a tolerance range of +/−10% unless otherwise specified in the below description. As used herein "substantially real time" refers to occurrence in a near instantaneous manner recognizing there may be real world delays for computing time, transmission, etc. Thus, unless otherwise specified, "substantially real time" refers to any timing between real time and real time plus 1 second.

As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

As used herein, "processor circuitry" is defined to include (i) one or more special purpose electrical circuits structured to perform specific operation(s) and including one or more semiconductor-based logic devices (e.g., electrical hardware implemented by one or more transistors), and/or (ii) one or more general purpose semiconductor-based electrical circuits programmable with instructions to perform specific operations and including one or more semiconductor-based logic devices (e.g., electrical hardware implemented by one or more transistors). Examples of processor circuitry include programmable microprocessors, Field Programmable Gate Arrays (FPGAs) that may instantiate instructions, Central Processor Units (CPUs), Graphics Processor Units (GPUs), Digital Signal Processors (DSPs), XPUs, or microcontrollers and integrated circuits such as Application Specific Integrated Circuits (ASICs). For example, an XPU may be implemented by a heterogeneous computing system including multiple types of processor circuitry (e.g., one or more FPGAs, one or more CPUs, one or more GPUs, one or more DSPs, etc., and/or a combination thereof) and application programming interface(s) (API(s)) that may assign computing task(s) to whichever one(s) of the multiple types of processor circuitry is/are best suited to execute the computing task(s).

DETAILED DESCRIPTION

A wireless networking device, such as a streaming meter device, can intercept wireless signals (e.g., Wi-Fi, Bluetooth, etc.) from a wireless router (e.g., Wi-Fi router) to a presentation device (e.g., a Smart TV, laptop, personal computer, mobile device, tablet, etc.), detect what content is being streamed, and measure the playback time and duration of the content. The wireless networking device or another example metering device in a household can determine who is/are streaming the content using audience recognition technology (e.g., facial, thermal, auditory recognition, etc.). Example wireless networking devices disclosed herein include a plurality of (e.g., two, four, six, etc.) wireless network interface controllers (WNICs) (e.g., WNICs, Bluetooth cards, etc.) integrated into the PCB of the device. Each one of the plurality of WNICs can include a plurality (e.g., two, four, six, etc.) of antennas to transmit and/or receive data via the wireless signals.

The WNIC(s), antenna(s), and/or connections (e.g., wires, solders, fasteners, etc.) of the wireless networking device 104 can be damaged, faulty, and/or improperly assembled. For example, a wire may be incompletely soldered to the PCB during manufacturing, may get disconnected during transportation, or may get damaged due to user tampering. To diagnose damages to antenna(s), hardware connections, etc., a technician may examine a first wireless networking device in a specialized room designed to prohibit external electromagnetic waves from entering. The technician sets a first WNIC to a reception mode and transmits data packets via wireless signals from a second wireless networking device at a known distance and orientation relative to the first wireless networking device. The technician measures received signal strength indicator (RSSI) values for antennas of the first WNIC and corresponding to each data packet received, determines average RSSI values for each of the antennas, determines whether each of the average RSSI values satisfies a threshold, and repeats the process for subsequent WNIC(s) of the wireless networking device. This process of diagnosing the defective WNIC(s) and/or antenna(s) is time consuming and requires the technician to remove the defective device from the household to conduct a test in the specialized room. When a significant number of wireless networking devices are damaged, there could be a significant backlog for the technician(s) to complete diagnostic tests. The longer the wireless networking device (e.g., streaming meter device) is out of commission due to diagnostics, repair, and replacement, the longer an associated organization (e.g., an audience measurement and ratings organization) is without data (e.g., streaming meter data), thus diminishing the efficiency at which a computing system (e.g., an audience measurement computing system) of the organization operates, such as by analyzing audience viewing behaviors and media ratings.

In the examples disclosed herein, an example wireless networking device (e.g., a streaming meter device) is enabled to perform a self-test of electromagnetic communication parts (e.g., WNICs, antennas, connection lines, etc.) based on a command from a remotely located back office or from a local source (e.g., a technician, personal computer, control device, etc.). In some examples, the wireless networking device includes four WNICs each with four associated antennas for intercepting wireless signals from a household router to presentation device(s) (e.g., Smart TV(s), laptop(s), mobile device(s), etc.). The example wireless networking device can set a first WNIC to a reception mode (e.g., a "receive only mode") and send data packets from a second WNIC. Other example WNICs (e.g., third and fourth WNICs) can be used to subsequently send data packets to the first WNIC in a similar manner. Furthermore, the example wireless networking device can determine average RSSI values for each antenna on the first WNIC. Since the locations of the second, third, and fourth WNICs are known relative to the first WNIC, thresholds corresponding to the average RSSI values of the antennas can be specified depending on which WNIC transmitted the data packets. When the average RSSI value of an antenna of the first WNIC does not satisfy the associated threshold, a counter corresponding to the antenna is incremented. Following completion of the self-test, when the counter of the antenna does not satisfy a second threshold, then the antenna is flagged as defective (e.g., repairs may be scheduled, the antenna may be disabled, etc.). For example, a technician can go to the household of the defective wireless networking device and replace the antenna or repair damaged connections, a household member can send the wireless networking device to a repair facility, a replacement antenna and/or connectors can be sent for the household member to repair the defective parts, and so forth.

FIG. 1 is a schematic illustration of an example first system 100 for monitoring streaming content. The example first system 100 illustrated in FIG. 1 includes an example presentation environment 102, an example wireless networking device 104, an example network 106, an example back office facility 108, an example streaming provider 110, an example wireless router 112, an example plurality of presentation devices 114-118 (e.g., an example Smart TV 114, an example laptop 116, and an example mobile device 118), and an example plurality of audience members 120A-C (e.g., an example first audience member 120A, an example second audience member 120B, and an example third audience member 120C). The example illustration of FIG. 1 depicts the example first system 100 as including three example presentation devices (the Smart TV 114, the laptop 116, and the mobile device 118). Additionally or alternatively, the example system can include presentation devices other than the plurality of presentation devices 114-118 depicted in FIG. 1. For example, the first system 100 may include one or more of a gaming console, a tablet, a hardware digital media player, and the like. Similarly, although the example plurality of audience members 120A-C includes the first audience member 120A, the second audience member 120B, and the third audience member 120C, the example first system 100 can include a larger or fewer quantity of audience members in the presentation environment 102.

The example first system 100 illustrated in FIG. 1 includes the example presentation environment 102 as a location in which online media (e.g., television shows, films, videos, etc.) can be streamed to the presentation devices 114-118 via wireless signals (e.g., Wi-Fi signals). The example presentation environment 102 illustrated in FIG. 1 is an example household. As such, the example audience members 120A-C can be referred to herein as household members. The household of the example presentation environment 102 can be a panel household wherein the household members have an agreement with an audience measurement and ratings organization to submit viewing information that describes an identity or demographic of a viewer, the content viewed, the duration of the viewing, how the content is viewed, etc.

The example first system 100 illustrated in FIG. 1 includes the example wireless networking device 104 to perform a self-test of example electromagnetic communication parts integrated therein. In some examples, the wireless networking device 104 can also receive wireless signals from the example wireless router 112, identify content streaming to the presentation device(s) 114-118, identify streaming platforms used to stream the content, measure the time and length of presentation of the content, etc. In some examples, the wireless networking device 104 is a standalone device connected to a power source (e.g., electrical outlet, battery pack, etc.) and positioned in household within a wireless communication range of the router 112 and the presentation device(s) 114-118. In such examples, the streaming meter device 104 includes a cased body to frame a printed circuit board with integrated programmable circuitry, storage device(s) (e.g., volatile and/or non-volatile memory), cooling systems (e.g., fans, heat sinks, immersive fluid cooling, etc.), WNIC(s) with multiple (e.g., two, four, six, etc.) antennas to connect to the wireless router 112 and the presentation device. In some examples, the wireless networking device 104 is a system on a chip integrated into the wireless router 112 to enable the wireless router 112 to function as a network access point for the presentation device(s) 114-118 and a meter to track the streaming services used thereon. Further aspects of the example wireless networking device 104 and the apparatus, methods, systems, and articles of manufacture to perform the self-test of the wireless networking device 104 are described in greater detail below.

The example first system 100 illustrated in FIG. 1 includes the example network 106 to facilitate communication between the example wireless networking device 104 and the example back office facility 108. Additionally, the example network 106 can enable communications between the example wireless router 112 and the example streaming provider 110. The example network 106 can be a wired network (e.g., a wide area network (WAN) such as the Internet) that uses protocols to send data from the a source (e.g., streaming provider 110) to a destination (e.g., the wireless router 112).

The example first system 100 illustrated in FIG. 1 includes the example back office facility 108 to control the example wireless networking device 104 and to measure audience data with an audience measurement computing system. The example back office facility 108 is a physical location of the audience measurement and ratings organization where operations can be conducted without customer and/or client interaction. For example, the back office facility 108 can store and manage servers (e.g., the audience measurement computing system) to process data obtained from panel households and analyze audience viewing behaviors and/or ratings of presented content. Analytical reports that the back office facility 108 performs based on data from the example wireless networking device 104 can be provided and sold to customers such as advertisement agencies, television networks, streaming providers, and so forth.

The example first system 100 illustrated in FIG. 1 includes the example streaming provider 110 to transmit streaming media to the example wireless router 112. The example streaming provider 110 can be an organization (e.g., Amazon®, Hulu®, Netflix®, etc.) that creates and/or distributes viewable media (e.g., films, television shows, cable, etc.) to audiences, devices, households, and so forth. The example wireless router 112 is included in the first system 100 to direct data transmitted from the streaming provider 110 to one or more of the presentation devices 114-118 in the presentation environment 102 via wireless signals. For example, the wireless router 112 is a Wi-Fi router that uses the Wi-Fi protocol to send data from the streaming provider 110 to the Smart TV 114. The example wireless networking device 104 disclosed herein can connect to the wireless router 112 and detect to which of the plurality of presentation devices 114-118 the wireless router 112 is streaming online media, timestamps of the start and end of the online media, and uniform resource locators (URLs) corresponding to the online media. Additionally or alternatively, the wireless networking device 104 can obtain credentials from the wireless router 112 as well as connect to the network 106 and the streaming provider 110. Thus, in such examples, the presentation devices 114-118 can connect directly to the wireless networking device 104 to stream media from the streaming provider 110 and can connect to the wireless router 112 seamlessly if the wireless networking device 104 were to shut down, restart, disfunction, etc.

The example methods and apparatus to self-test wireless networking devices disclosed herein are described with reference to streaming meter devices as mentioned previously. However, other wireless networking devices can be enabled (e.g., via executing written instructions and/or operations) to perform the self-test described below. For example, the wireless router 112 can be enabled to perform a self-test of integrated electromagnetic communication parts (e.g., Wi-Fi cards, antennas, associated connections, etc.) used to transmit and receive wireless signals. Other example wireless networking devices are capable of performing the self-test as described herein when a plurality of (e.g., two, four, six, etc.) WNICs and a plurality of (e.g., one, two, four, etc.) antennas are integrated into the PCBs of the devices. Such other example wireless networking devices can include Wi-Fi routers, personal computers, workstations, streaming meters, and so forth.

Figure 2:
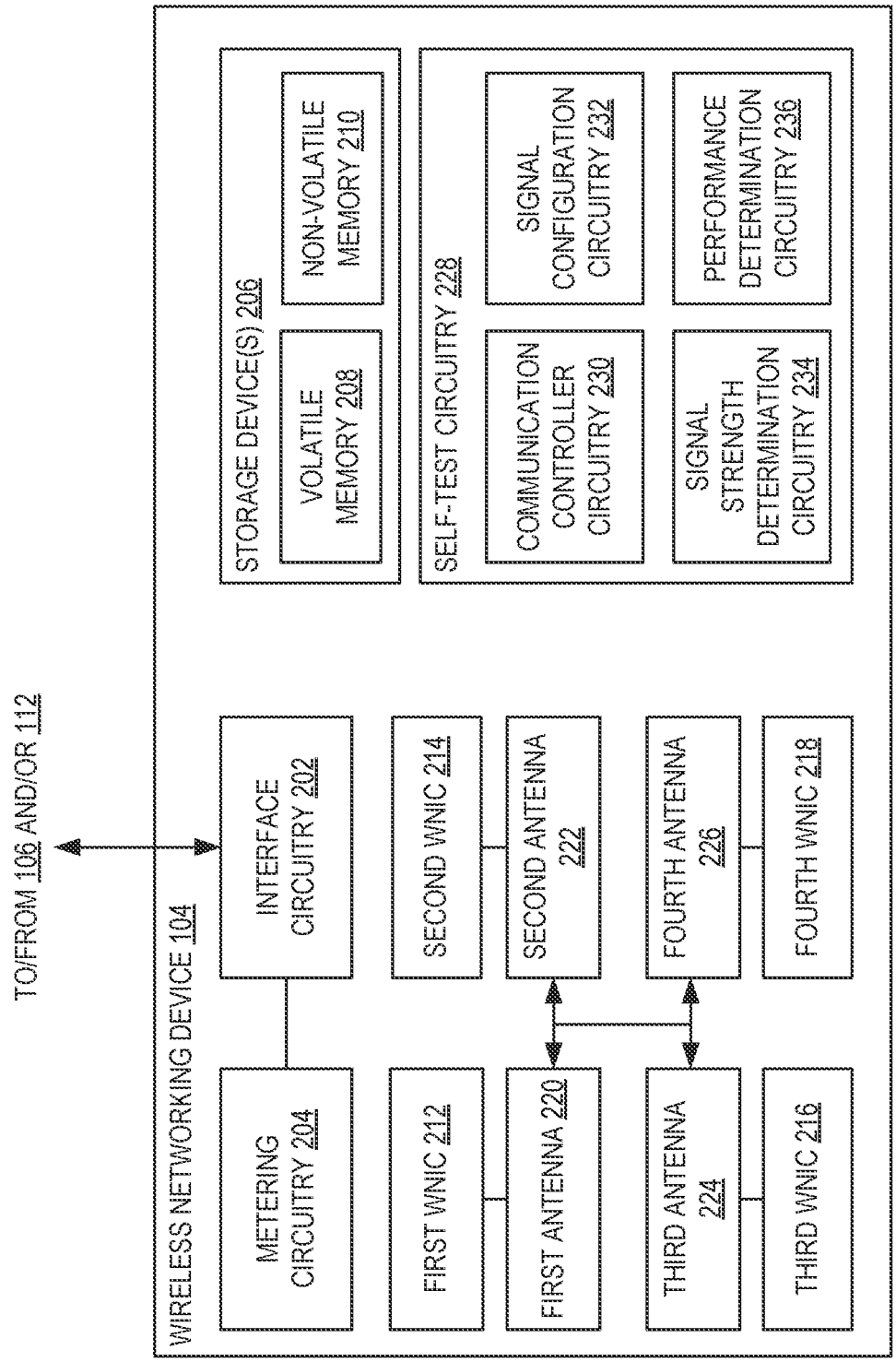
FIG. 2 is a schematic illustration of an example wireless networking device implemented to conduct a self-test in accordance with teachings disclosed herein.

FIG. 2 is a block diagram of an example implementation of the wireless networking device 104 of FIG. 1 that includes self-test capabilities. The wireless networking device 104 of FIG. 2 may be instantiated (e.g., creating an instance of, bring into being for any length of time, materialize, implement, etc.) by processor circuitry such as a central processing unit executing instructions. Additionally or alternatively, the wireless networking device 104 of FIG. 2 may be instantiated (e.g., creating an instance of, bring into being for any length of time, materialize, implement, etc.) by an ASIC or an FPGA structured to perform operations corresponding to the instructions. It should be understood that some or all of the circuitry of FIG. 2 may, thus, be instantiated at the same or different times. Some or all of the circuitry may be instantiated, for example, in one or more threads executing in parallel and/or in series on hardware. Moreover, in some examples, some or all of the circuitry of FIG. 2 may be implemented by microprocessor circuitry executing instructions to implement one or more virtual machines and/or containers.

The example wireless networking device 104 of FIG. 2 includes example interface circuitry 202 to communicatively couple the wireless networking device 104 to the example network 106. In some examples, the interface circuitry 202 is instantiated by processor circuitry executing interface circuitry instructions and/or configured to perform operations such as those represented by the flowchart of FIG. 3. Additionally or alternatively, the example interface circuitry 202 can be instantiated by a network interface controller (NIC) to connect to the network 106 via a wired connection (e.g., ethernet cable). As illustrated in the example FIG. 2, the interface circuitry 202 can obtain first data (e.g., thresholds) from the back office facility 108 and direct the first data to integrated circuitry of the wireless networking device 104. Similarly, the interface circuitry 202 can send second data (e.g., self-test results) from the integrated circuitry of the wireless networking device 104 to the back office facility 108. In some examples, the interface circuitry 202 may not solely connect to the network 106 via wired connection. Additionally or alternatively, the example wireless networking device 104 may send and receive data to the back office facility 108 with a wireless connection (e.g., Wi-Fi, Bluetooth, etc.) via the example wireless router 112.

The example metering circuitry 204 measures data corresponding to viewing of streaming online media sent from the streaming provider 110. The example metering circuitry 204 can obtain metadata associated with the streaming media from the wireless router 112. In some examples, the metering circuitry 204 is enabled to directly communicate with the streaming provider 110 via the network 106 and/or the interface circuitry 202 to obtain metadata associated with the streaming online media. Similarly, the example metering circuitry 204 can transmit measurement data (e.g., start time, end time, URL, presentation device, etc.) corresponding to the streaming media to the back office facility 108 over the network 106 via the wireless router 112 and/or the interface circuitry 202.

The example wireless networking device 104 illustrated in FIG. 2 includes example storage device(s) 206 to store data and written instructions corresponding to the example methods and apparatus disclosed herein. As illustrated in FIG. 2, the storage device(s) 206 can include one or more of example volatile memory 208 and example non-volatile memory 210. The example volatile memory 208 can include cache memory and/or random access memory (RAM) to temporarily store data such as a counter for a given antenna, an average RSSI value for the antenna, a result of the self-test, and so forth. The example non-volatile memory 210 can include flash memory, read-only memory, and/or magnetic storage device(s) to permanently store example written self-test instructions and/or operations, thresholds used for the self-test, and so forth.

The example wireless networking device 104 illustrated in FIG. 2 includes an example first WNIC 212, an example second WNIC 214, an example third WNIC 216, and an example fourth WNIC 218 to connect to the wireless router 112 via electromagnetic signals. In some examples, the electromagnetic signals are Wi-Fi signals corresponding to a Wi-Fi protocol. The example WNICs 212-218 can transmit and receive wireless signals to each other to perform the self-test. For example, the first WNIC 212 can be set to a reception mode, and the second WNIC 214 can transmit data packets to the first WNIC 212. The example WNICs 212-218 can transmit data packets over different frequencies (e.g., 2.4 gigahertz (GHz), 5 GHZ, etc.) and at different data rates (e.g., 2 megabits per second (Mbps), 11 Mbps, 54 Mbps, etc.). Although the illustrated example of FIG. 2 includes four example WNICs 212-218, the example wireless networking device 104 can include a larger or fewer quantity of WNICs (e.g., two, three, six, etc.). Although examples disclosed herein refer to the WNICs 212-218 as enabled to communicate data packets at two frequencies (e.g., 2.4 GHz and 5 GHz) according to the Wi-Fi protocol, the example WNICs 212-218 and the wireless networking device 104 can operate and communicate at other frequencies and data rates according to other wireless networking protocols. For example, the wireless networking device 104 can send/receive data packets under a Bluetooth protocol at frequencies of 2.45 GHz, under a Zigbee protocol at frequencies of 2.4 GHz, 915 Megahertz (MHz), 868 MHz and at data rates of 250 kilobytes per second (kbps), 100 kbps, 40 kbps, 20 kbps, etc., and so forth.

Although the WNICs 212-218 illustrated in FIG. 2 are referred to herein as representing one WNIC each, there could be more than one WNICs combined on a single PCB. For example, the first WNIC 212 can be a PCB to include a set of circuitry cards that independently perform the function of a WNIC as described herein. Furthermore, when the first WNIC 212 is a first set of WNICs 212, respective WNICs of the first set of WNICs 212 can be connected and/or fixed to an antenna. In some examples, the WNICs 212-218 are sets of WNICs 212-218, wherein a first WNIC of the first set of WNICs 212 can send data packets to a second WNIC of the first set of WNICs 212. Thus, in some examples, the wireless networking device 104 includes a WNIC with circuitry cards (e.g., WNICs, Wi-Fi cards, etc.) and antennas integrated therein which enable the wireless networking device 104 to perform the self-test.

The example wireless networking device 104 illustrated in FIG. 2 includes an example first antenna 220, an example second antenna 222, an example third antenna 224, and an example fourth antenna 226 to send and receive data packets over wireless signals. The example antennas 220-226 are integrated into the WNICs 212-218 via wired connections, mountings, fixtures, fasteners, etc. In some examples, the antennas 220-226 are integrated into one or more PCBs of the wireless networking device 104 and connected to the WNICs 212-218 via wiring (e.g., printed wiring). The wired connections and/or soldering that integrate the example WNICs 212-218 and/or the example antennas 220-226 to the wireless networking device 104 can be assembled by manufacturers and/or automated machines. In the illustrated example of FIG. 2, the antennas 220-226 are in communication with the wireless router 112 via wireless connection(s) such as Wi-Fi signals. In some examples, the wireless networking device 104 is connected to the wireless router 112 via the interface circuitry 202 and a wired connection.

Although the antennas 220-226 illustrated in FIG. 2 are referred to herein as representing one antenna for each of the example WNICs 212-218, there could be more than one of the antennas 220-226 connected and/or fixed to the WNICs 212-218. For example, the first, second, third, and fourth antennas 220-226 can be first, second, third, and fourth sets of antennas wherein the sets of antennas each include a plurality of (e.g., two, four, six, etc.) antennas. When the antennas 220-226 correspond to sets of antennas, the example WNICs 212-218 can transmit and/or receive data packets via one or more antennas in the sets of antennas. The antennas 220-226 may be included as sets of antennas in example wireless networking device 104 for redundancy measures and/or to strengthen a transmission signal of the associated WNICs 212-218. That is, for example, the first antenna 220 can correspond to a first set of antennas 220A-D, and the first WNIC 212 can transmit data packets (e.g., 50, 75, 100 data packets, etc.) from a first antenna 220A of the first set of antennas 220A-D. In some examples, the first WNIC 212 can transmit data packets from the first antenna 220A in conjunction with one or more other second, third, and/or fourth antennas 220B-C to strengthen the output signal of the first WNIC 212.

The example wireless networking device 104 illustrated in FIG. 2 includes example self-test circuitry 228 to conduct the self-test of the wireless networking device 104 as mentioned previously. In some examples, the self-test circuitry 228 is instantiated by processor circuitry executing self-test instructions and/or configured to perform operations such as those represented by the flowcharts of FIGS. 3-5. The example self-test circuitry 228 can include example communication controller circuitry 230, example signal configuration circuitry 232, signal strength determination circuitry 234, and example performance determination circuitry 236 to perform the self-test as described herein. In some examples, the self-test circuitry 228 includes additional and/or alternative integrated circuitry to perform the self-test of the wireless networking device 104.

The example wireless networking device 104 illustrated in FIG. 2 includes the example communication controller circuitry 230 to cause the communication of data to and from the back office facility 108 via the interface circuitry 202 and/or the wireless router 112. In some examples, the communication controller circuitry 230 is instantiated by processor circuitry executing communication controller instructions and/or configured to perform operations such as those represented by the flowcharts of FIGS. 3 and/or 5. In some examples, the data that the communication controller circuitry 230 causes to be transmitted and/or received includes thresholds (e.g., an RSSI threshold and a counter threshold), written instructions and/or operations, and/or self-test results. The example communication controller circuitry 230 can also cause the WNICs 212-218 to inter-communicate by sending and/or obtaining data packets amongst themselves. For example, the communication controller circuitry 230 can command the second WNIC 214 to send 50 data packets to the first WNIC 212 as part of the self-test. The second WNIC 214 can use the second antenna 222 to send the data packets. In some examples, the second WNIC 214 can use a set of second antennas 222 in parallel or in series to send the data packets. Similarly, the first WNIC 212 can use the first antenna 220 or a set of first antennas 220 to obtain, collect, gather, and/or retrieve the data packets in parallel or in series to obtain the data packets.

The example wireless networking device 104 illustrated in FIG. 2 includes the example signal configuration circuitry 232 to configure the first, second, third, and fourth WNICs 212-218 to operate (e.g., transmit and receive) wireless signals at a particular frequency and/or data rate. In some examples, the signal configuration circuitry 232 is instantiated by processor circuitry executing signal configuration circuitry instructions and/or configured to perform operations such as those represented by the flowcharts of FIGS. 4-5. In some examples, the signal configuration circuitry 232 can cause the plurality of WNICs 212-218 to communicate via Wi-Fi signals at frequencies of 2.4 GHz or 5 GHz and/or at data rates of 2 Mbps, 11 Mbps, or 54 Mbps.

The example signal configuration circuitry 232 can also cause one or more of the plurality of WNICs 212-218 to operate in a reception mode (e.g., "receive-only" mode). For example, the signal configuration circuitry 232 can set the first WNIC 212 to a reception mode and cause the first antenna 220 to operate as a receivers and not as a transmitter until the reception mode is disabled. When the example first WNIC 212 is set to a reception mode, the first WNIC 212 does not adhere to transmission commands written into the instructions and/or operations stored on the wireless networking device 104. In some examples, when the wireless networking device 104 corresponds to a streaming meter device, and the reception mode allows the associated one(s) of the plurality of WNICs 212-218 to not transmit metering data to the back office 108 via the associated one(s) of the antennas 220-226. Thus, when the self-test is being performed on the example first WNIC 212, the RSSI values calculated for the first antenna 220 are not influenced or diminished due to a transmission signal via the first antenna 220.

The example wireless networking device 104 illustrated in FIG. 2 includes the example signal strength determination circuitry 234 to determine RSSI values and an average RSSI value for the antennas 220-226 of the WNICs 212-218. In some examples, the signal strength determination circuitry 234 is instantiated by processor circuitry executing signal strength determination instructions and/or configured to perform operations such as those represented by the flowchart of FIG. 5. The received signal strength indicator (RSSI) values of the WNICs 212-218 are measurements of how well the antennas 220-226 are obtaining signals from the example wireless router 112. The RSSI values represent the power present in a received radio signal (e.g., Wi-Fi signal) and how strong of a connection associated one(s) of the WNICs 212-218 and the antennas 220-226 are able to establish with a transmitter such as the wireless router 112 or other one(s) of the WNICs 212-218. In some examples, the RSSI values are unitless and/or relative to a manufacturer of the WNICs 212-218 and/or the wireless networking device 104. In such examples, the RSSI values may range from 0-60, 0-100, etc., wherein the higher value, the stronger the signal. In some examples, the RSSI values are standardized and computed to be represented in units of decibels (dBm) on a logarithmic scale. In such examples, the RSSI values may range from −100 to 0 dBm, −60 to 0 dBm, etc., wherein the closer to zero, the stronger the signal.

The example signal strength determination circuitry 234 can also determine the average RSSI values associated with the antennas 220-226 and based on the measured RSSI values for a stage of the self-test. For example, when the first WNIC 212 and the first antenna 220 are being tested, the second, third, and fourth WNICs 214-216 can transmit a plurality of data packets in series. When the second WNIC 214 sends 50 data packets to the first WNIC 212, the signal strength determination circuitry 234 can measure 50 RSSI values of the first antenna 220 for that stage of the self-test. The example signal strength determination circuitry 232 can then calculate the average RSSI value for the first antenna 220 based on the 50 measured RSSI values. When the example second, third, and fourth WNICs 214-216 transmit the plurality of data packets to the first WNIC 212 in series, the signal strength determination circuitry 234 determines three average RSSI values for the first antenna 220 at the given frequency (e.g., 2.4 GHz or 5 GHz) of the wireless networking device 104 that the signal configuration circuitry 232 has set.

As described further below, the self-test can be conducted at two different frequencies, such as a Wi-Fi signal frequencies of 2.4 GHz and 5 GHz. Thus, the example signal strength determination circuitry 234 illustrated in FIG. 2 can determine six total average RSSI values for the example first WNIC 212. That is, the second, third, and fourth WNICs 214-218 can transmit the pluralities of data packets in series at an example first frequency (e.g., 2.4 GHz) and at an example second frequency (e.g., 5 GHz). Thus, when the plurality of data packets corresponds to 50 data packets, the signal strength determination circuitry 234 determines 150 RSSI values and three average RSSI values corresponding to the first frequency and another 150 RSSI values and three average RSSI values corresponding to the second frequency for each of the WNICs 212-218 and antennas 220-226.

The example wireless networking device 104 illustrated in FIG. 2 includes the example performance determination circuitry 236 to determine the results of the self-test corresponding to the wireless networking device 104. In some examples, the performance determination circuitry 236 is instantiated by processor circuitry executing performance determination instructions and/or configured to perform operations such as those represented by the flowcharts of FIGS. 3-5. The example performance determination circuitry 236 can determine whether an average RSSI value of the WNICs 212-218 satisfies the first threshold, otherwise referred to as an RSSI threshold. For example, when the first threshold is an RSSI value of −50 dBm, the performance determination circuitry 236 determines that the average RSSI values of the WNICs 212-218 are satisfy the first threshold when the average RSSI values are greater than −50 dBm. When one of the average RSSI values associated with one of the WNICs 212-218 does not satisfy the first threshold, then the example performance determination circuitry 236 increments a counter associated with the corresponding one of the WNICs 212-218.

The example performance determination circuitry 236 can determine whether the counters of the WNICs 212-218 satisfy a second threshold. The example second threshold corresponds to half of the total number stages for one of the WNICs 212-218 during the self-test, wherein one stage is when one of the WNICs 212-218 obtains the plurality of data packets from the each of the other WNICs 212-218. Thus, for the wireless networking device 104 illustrated in FIG. 2, the total number of stages for one of the WNICs 212-218 during the self-test is six, and the second threshold is three. For example, the first WNIC 212 obtains pluralities of data packets from respective ones of the second, third, and fourth WNICs 214-218 at the first frequency and then again at the second frequency. In some examples, when the wireless networking device 104 includes six WNICs (instead of the four WNICs 212-218 of FIG. 2), the total number of stages for each of the WNICs is 10, and the second threshold is 5, and so on. In some examples, to have a more conservative self-test, the back office facility 108 may set the second threshold to a lower value, such as one-third the total number of stages, or two, in the illustrated example of FIG. 2.

In some examples, the back office facility 108 determines the first and second thresholds on site and transmits the first and second thresholds to the wireless networking device 104 for the example performance determination circuitry 236 to use in the self-test. In some examples, to determine the first threshold, technicians at the back office facility 108 first personally assemble and/or evaluate a wireless networking device that is proven to have no malfunctioning parts or circuitry and/or no improper connections. The technicians can then conduct a portion of the self-test that includes transmitting data packets, measuring RSSI values, and determining average RSSI values. That way the first threshold can be updated when other versions of the wireless networking device 104 are manufactured with possibly different types of WNICs 212-218 with different signal strength ranges, limitations, and/or capabilities. In some examples, multiple first thresholds are determined that correspond to respective ones of the WNICs 212-218. That is, in some examples, there is a first threshold (e.g., −50 dBm) corresponding to the first WNIC 212, another first threshold (e.g., −52 dBm) corresponding to the second WNIC 214, and so forth.

In some examples, the performance determination circuitry 236 generates a self-test result that indicates which one(s) of the antennas 220-226 and/or the WNICs 212-218 do not pass the self-test and/or are flagged as defective. In other words, when the counters of respective ones of the antennas 220-226 do not satisfy the second threshold, the performance determination circuitry 236 sends a notification to the back office facility 108 indicating which one(s) of the respective antennas 220-226 are flagged as defective. When the back office facility 108 receives the self-test report and/or notifications indicating which of the antennas 220-226 are flagged as defective, the back office facility 108 or another arm of the example organization can send a technician to the example presentation environment 102 of FIG. 1 to repair and/or replace the wireless networking device 104 and/or parts, circuitry, wiring, fasteners, etc. included therein. Additionally or alternatively, a user of the wireless networking device 104 can send the damaged device 104 to the back office facility 108 where technicians can repair and/or replace damaged components therein without spending time, energy, resources, etc. diagnosing and/or testing to determine which of the components are damaged and/or improperly assembled.

In some examples, the apparatus includes means for communicating data to and from the back office facility 108 via the interface circuitry 202. For example, the means for communicating may be implemented by communication controller circuitry 230. In some examples, the communication controller circuitry 230 may be instantiated by processor circuitry such as the example processor circuitry 612 of FIG. 6. For instance, the communication controller circuitry 230 may be instantiated by the example microprocessor 700 of FIG. 7 executing machine executable instructions such as those implemented by at least blocks 302, 304, and 308 of FIGS. 3 and 504, 506, and 510 of FIG. 5. In some examples, the communication controller circuitry 230 may be instantiated by hardware logic circuitry, which may be implemented by an ASIC, XPU, or the FPGA circuitry 800 of FIG. 8 structured to perform operations corresponding to the machine readable instructions. Additionally or alternatively, the communication controller circuitry 230 may be instantiated by any other combination of hardware, software, and/or firmware. For example, the communication controller circuitry 230 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In some examples, the apparatus includes means for setting a frequency at which electromagnetic signals (e.g., Wi-Fi signals) are transmitted from the WNICs 212-218 of the wireless networking device 104. For example, the means for setting may be implemented by signal configuration circuitry 232. In some examples, the signal configuration circuitry 232 may be instantiated by processor circuitry such as the example processor circuitry 612 of FIG. 6. For instance, the signal configuration circuitry 232 may be instantiated by the example microprocessor 700 of FIG. 7 executing machine executable instructions such as those implemented by at least blocks 402 and 410 of FIG. 4 and

Figure 5:
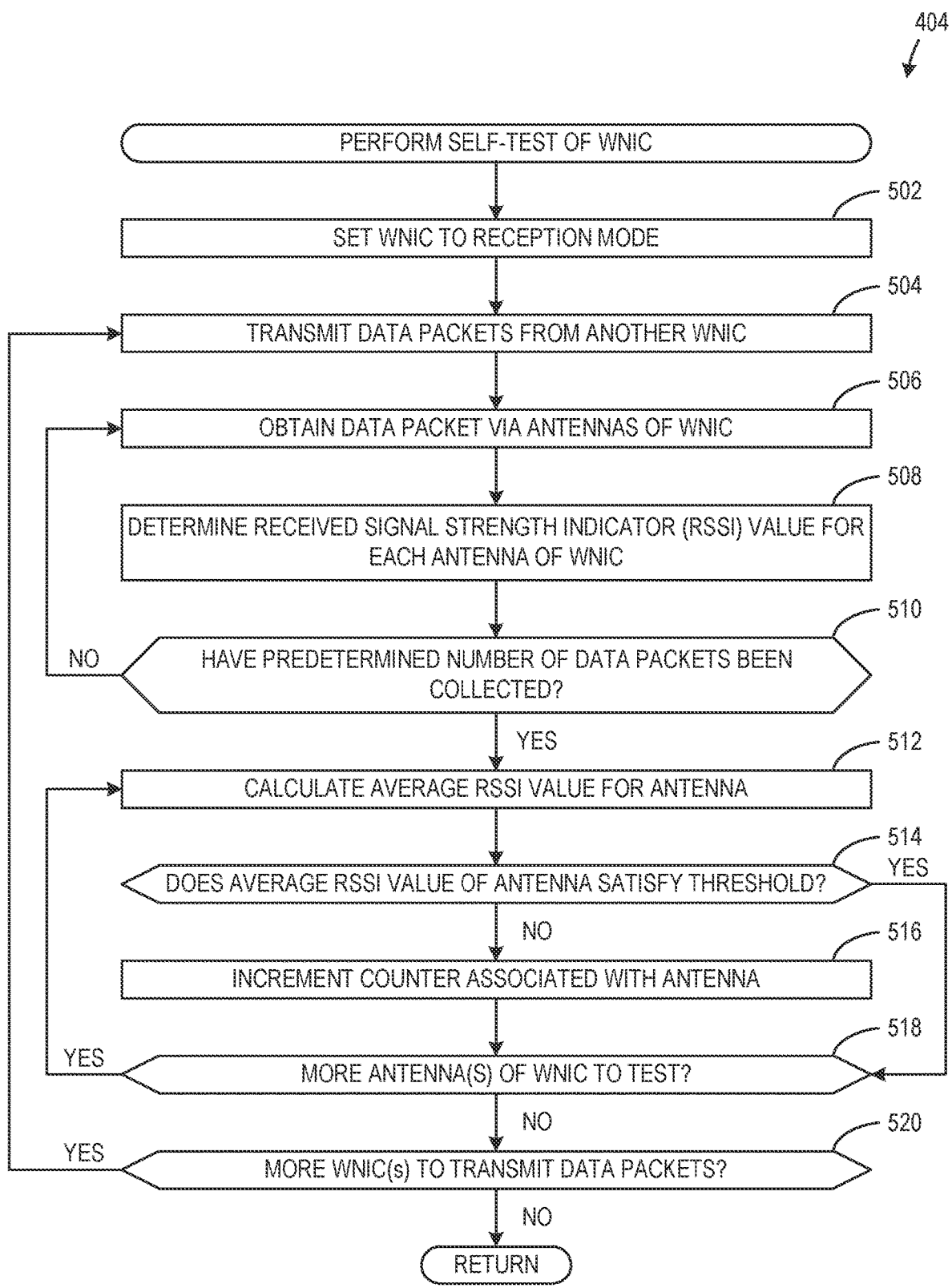

502 of FIG. 5. In some examples, the signal configuration circuitry 232 may be instantiated by hardware logic circuitry, which may be implemented by an ASIC, XPU, or the FPGA circuitry 800 of FIG. 8 structured to perform operations corresponding to the machine readable instructions. Additionally or alternatively, the signal configuration circuitry 232 may be instantiated by any other combination of hardware, software, and/or firmware. For example, the signal configuration circuitry 232 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In some examples, the apparatus includes means for determining the RSSI values and the average RSSI values corresponding to the antennas 220-226 of the wireless networking device 104. For example, the means for determining may be implemented by signal strength determination circuitry 234. In some examples, the signal strength determination circuitry 234 may be instantiated by processor circuitry such as the example processor circuitry 612 of FIG. 6. For instance, the signal strength determination circuitry 234 may be instantiated by the example microprocessor 700 of FIG. 7 executing machine executable instructions such as those implemented by at least blocks 508 and 512 of FIG. 5. In some examples, the signal strength determination circuitry 234 may be instantiated by hardware logic circuitry, which may be implemented by an ASIC, XPU, or the FPGA circuitry 800 of FIG. 8 structured to perform operations corresponding to the machine readable instructions. Additionally or alternatively, the signal strength determination circuitry 234 may be instantiated by any other combination of hardware, software, and/or firmware. For example, the signal strength determination circuitry 234 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In some examples, the apparatus includes means for determining the performance of the wireless networking device 104 based on the average RSSI values, the counters, the first threshold, and the second threshold corresponding to the antennas 220-226. For example, the means for determining may be implemented by performance determination circuitry 236. In some examples, the performance determination circuitry 236 may be instantiated by processor circuitry such as the example processor circuitry 612 of FIG. 6. For instance, the performance determination circuitry 236 may be instantiated by the example microprocessor 700 of FIG. 7 executing machine executable instructions such as those implemented by at least blocks 306 of FIGS. 3, 404-408 and 412-418 of FIG. 4, and 514-520 of FIG. 5. In some examples, the performance determination circuitry 236 may be instantiated by hardware logic circuitry, which may be implemented by an ASIC, XPU, or the FPGA circuitry 800 of FIG. 8 structured to perform operations corresponding to the machine readable instructions. Additionally or alternatively, the performance determination circuitry 236 may be instantiated by any other combination of hardware, software, and/or firmware. For example, the performance determination circuitry 236 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

While an example manner of implementing the wireless networking device 104 of FIG. 1 is illustrated in FIG. 2, one or more of the elements, processes, and/or devices illustrated in FIG. 2 may be combined, divided, re-arranged, omitted, eliminated, and/or implemented in any other way. Further, the example communication controller circuitry 230, the example signal configuration circuitry 232, the example signal strength determination circuitry 234, the example performance determination circuitry 236, and/or, more generally, the wireless networking device 104 of FIG. 2, may be implemented by hardware alone or by hardware in combination with software and/or firmware. Thus, for example, any of the example communication controller circuitry 230, the example signal configuration circuitry 232, the example signal strength determination circuitry 234, the example performance determination circuitry 236, and/or, more generally, the example wireless networking device 104, could be implemented by processor circuitry, analog circuit(s), digital circuit(s), logic circuit(s), programmable processor(s), programmable microcontroller(s), graphics processing unit(s) (GPU(s)), digital signal processor(s) (DSP(s)), application specific integrated circuit(s) (ASIC(s)), programmable logic device(s) (PLD(s)), and/or field programmable logic device(s) (FPLD(s)) such as Field Programmable Gate Arrays (FPGAs). Further still, the example wireless networking device 104 of FIG. 1 may include one or more elements, processes, and/or devices in addition to, or instead of, those illustrated in FIG. 2, and/or may include more than one of any or all of the illustrated elements, processes and devices.

Figure 3:
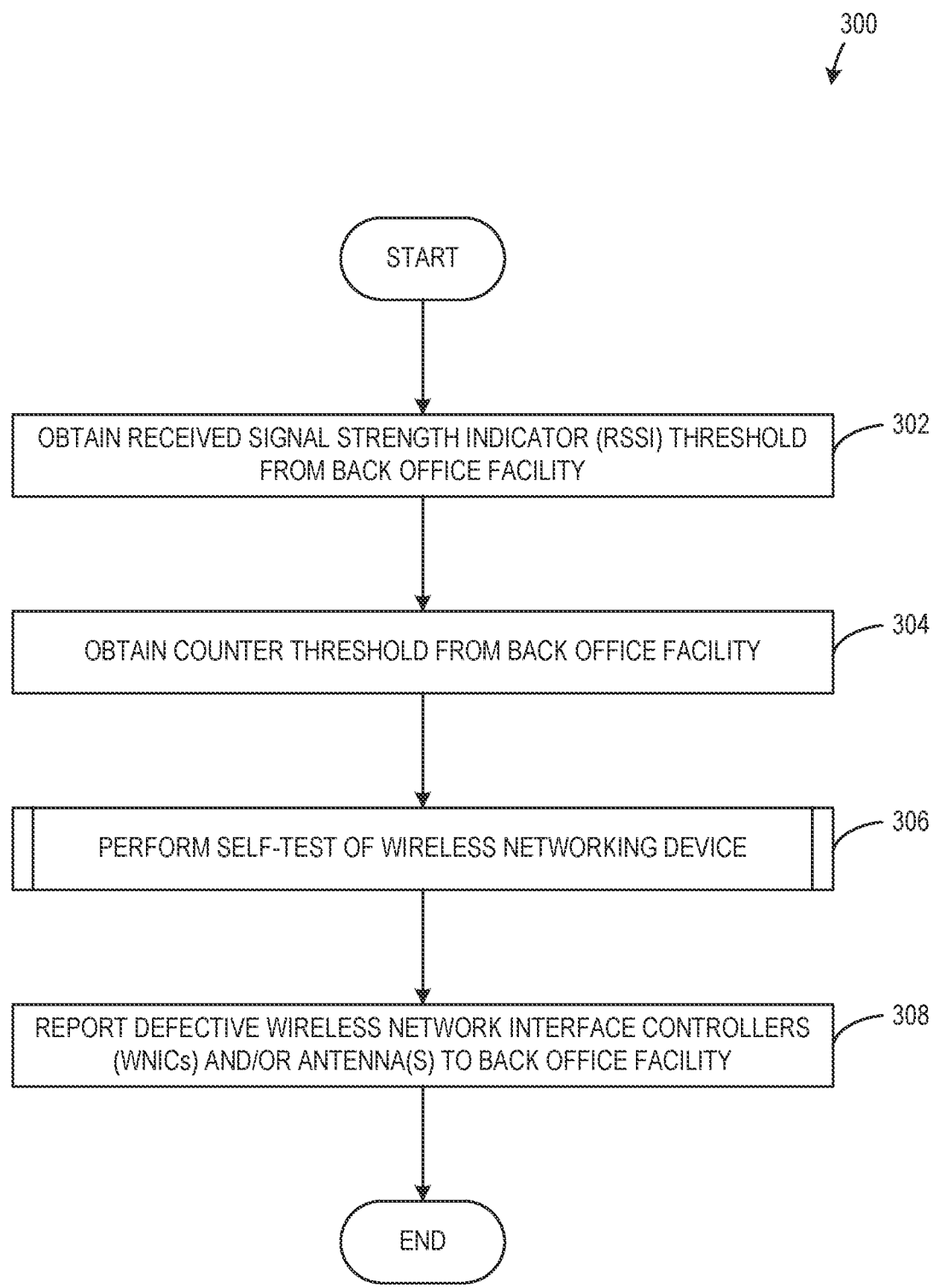
FIGS. 3-5 illustrate a flowchart representative of example machine readable instructions and/or example operations that may be executed by example processor circuitry to implement the example wireless networking device of FIG. 2.
Figure 4:
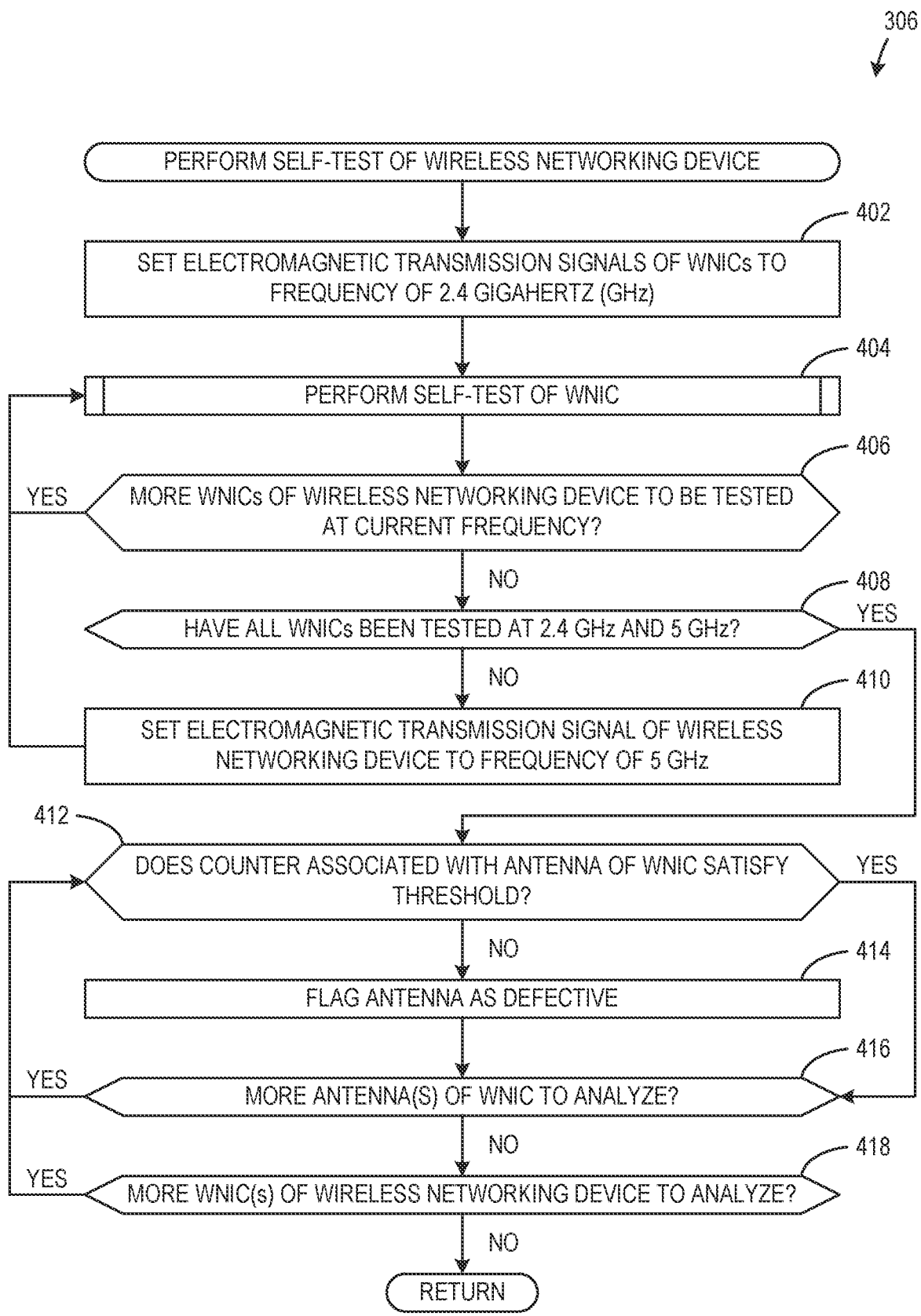

Flowcharts representative of example machine readable instructions, which may be executed to configure processor circuitry to implement the wireless networking device 104 of FIGS. 1 and 2, are shown in FIGS. 3-5. The machine readable instructions may be one or more executable programs or portion(s) of an executable program for execution by processor circuitry, such as the processor circuitry 612 shown in the example processor platform 600 discussed below in connection with FIG. 6 and/or the example processor circuitry discussed below in connection with FIGS. 7 and/or 8. The program may be embodied in software stored on one or more non-transitory computer readable storage media such as a compact disk (CD), a floppy disk, a hard disk drive (HDD), a solid-state drive (SSD), a digital versatile disk (DVD), a Blu-ray disk, a volatile memory (e.g., Random Access Memory (RAM) of any type, etc.), or a non-volatile memory (e.g., electrically erasable programmable read-only memory (EEPROM), FLASH memory, an HDD, an SSD, etc.) associated with processor circuitry located in one or more hardware devices, but the entire program and/or parts thereof could alternatively be executed by one or more hardware devices other than the processor circuitry and/or embodied in firmware or dedicated hardware. The machine readable instructions may be distributed across multiple hardware devices and/or executed by two or more hardware devices (e.g., a server and a client hardware device). For example, the client hardware device may be implemented by an endpoint client hardware device (e.g., a hardware device associated with a user) or an intermediate client hardware device (e.g., a radio access network (RAN)) gateway that may facilitate communication between a server and an endpoint client hardware device). Similarly, the non-transitory computer readable storage media may include one or more mediums located in one or more hardware devices. Further, although the example program is described with reference to the flowcharts illustrated in FIGS. 3-5, many other methods of implementing the example wireless networking device 104 may alternatively be used. For example, the order of execution of the blocks may be changed, and/or some of the blocks described may be changed, eliminated, or combined. Additionally or alternatively, any or all of the blocks may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more hardware devices (e.g., a single-core processor (e.g., a single core central processor unit (CPU)), a multi-core processor (e.g., a multi-core CPU, an XPU, etc.) in a single machine, multiple processors distributed across multiple servers of a server rack, multiple processors distributed across one or more server racks, a CPU and/or a FPGA located in the same package (e.g., the same integrated circuit (IC) package or in two or more separate housings, etc.).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., as portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine readable instructions may be stored in multiple parts, which are individually compressed, encrypted, and/or stored on separate computing devices, wherein the parts when decrypted, decompressed, and/or combined form a set of machine executable instructions that implement one or more operations that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc., in order to execute the machine readable instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example operations of FIGS. 3-5 may be implemented using executable instructions (e.g., computer and/or machine readable instructions) stored on one or more non-transitory computer and/or machine readable media such as optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms non-transitory computer readable medium, non-transitory computer readable storage medium, non-transitory machine readable medium, and non-transitory machine readable storage medium are expressly defined to include any type of computer readable storage device and/or storage disk and to exclude propagating signals and to exclude transmission media. As used herein, the terms "computer readable storage device" and "machine readable storage device" are defined to include any physical (mechanical and/or electrical) structure to store information, but to exclude propagating signals and to exclude transmission media. Examples of computer readable storage devices and machine readable storage devices include random access memory of any type, read only memory of any type, solid state memory, flash memory, optical discs, magnetic disks, disk drives, and/or redundant array of independent disks (RAID) systems. As used herein, the term "device" refers to physical structure such as mechanical and/or electrical equipment, hardware, and/or circuitry that may or may not be configured by computer readable instructions, machine readable instructions, etc., and/or manufactured to execute computer readable instructions, machine readable instructions, etc.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements or method actions may be implemented by, e.g., the same entity or object. Additionally, although individual features may be included in different examples or claims, these may possibly be combined, and the inclusion in different examples or claims does not imply that a combination of features is not feasible and/or advantageous.

FIG. 3 is a flowchart representative of example machine readable instructions and/or example operations 300 that may be executed and/or instantiated by processor circuitry to implement the wireless networking device 104 of FIGS. 1 and 2 to interface with the back office facility 108, perform a self-test of the WNICs 212-218 and the antennas 220-226, and report the defective antenna(s) 220-226 and/or the associated WNIC(s) 212-218 to the back office facility 108. The machine readable instructions and/or the operations 300 of FIG. 3 begin at block 302, at which the wireless networking device 104 obtains a first threshold (e.g., an RSSI threshold) from the back office facility 108. For example, the communication controller circuitry 230 can query or cause the interface circuitry 202 to query the back office facility 108 for the first threshold to be used in the self-test to determine whether average RSSI values of respective ones of the antennas 220-226 satisfies the RSSI threshold.

At block 304, the wireless networking device 104 obtains a second threshold (e.g., a counter threshold) from the back office facility 108. For example, similar to block 302, the communication controller circuitry 230 can query or cause the interface circuitry 202 to query the back office facility 108 for the second threshold to be used in the self-test to determine whether counters of respective ones of the antennas 220-226 satisfies the counter threshold.

At block 306, the wireless networking device 104 performs the self-test of the wireless networking device 104. For example, the self-test circuitry 228 executes and/or instantiates example machine readable instructions and/or example operations 306 to implement the functionality of the communication controller circuitry 230, the signal configuration circuitry 232, the signal strength determination circuitry 234, and the performance determination circuitry 236 of FIG. 2 to perform the self-test of the WNICs 212-218 and/or the antennas 220-226. The example machine readable instructions and/or the example operations 306 are described in greater detail below in reference to FIG. 4.

At block 308, the wireless networking device 104 reports defective WNICs 212-218 and/or antennas 220-226 to the back office facility 108. For example, the communication controller circuitry 230 causes the interface circuitry 202 to send a self-test report and/or identification(s) corresponding to the antennas 220-226 with counters that do not satisfy the second threshold and/or the WNIC(s) 212-218 associated with the defective antenna(s) 220-226.

FIG. 4 is a flowchart representative of the example machine readable instructions and/or the example operations 306 that may be executed and/or instantiated by processor circuitry to implement the self-test circuitry 228 of FIG. 2 to perform a self-test of the wireless networking device 104. The machine readable instructions and/or the operations 306 of FIG. 4 begin at block 402, at which the wireless networking device 104 sets electromagnetic transmission signals of the WNICs 212-218 to a first frequency of 2.4 GHz. For example, the signal configuration circuitry 232 can adjust a frequency setting of the wireless networking device 104 and/or one or more of the WNICs 212-218 to output at 2.4 GHz. As mentioned previously, the wireless networking device 104 and the WNICs 212-218 integrated therein can communicate data packets at other frequencies according to other wireless networking protocols (e.g., Bluetooth, Zigbee, etc.). As such, the example machine readable instructions 306 can be executed to implement the self-test circuitry 228 to perform the self-test at frequencies other than described in reference to FIG. 4, such as 915 MHz and 2.4 GHz under the Zigbee protocol as opposed to 2.4 GHz and 5 GHz under the Wi-Fi protocol.

At block 404, the wireless networking device 104 performs a portion of the self-test on a first one of the WNICs 212-218. For example, the performance determination circuitry 236 initiates the self-test on the first WNIC 212. The example machine readable instructions and/or the example operations 404 are described in greater detail below in reference to FIG. 5.

At block 406, the wireless networking device 104 determines whether more of the WNICs 212-218 are to be tested at a current frequency setting. For example, the performance determination circuitry 236 can query the storage device(s) 206 to determine, identify, detect, and/or recognize whether the number of test results (e.g., counter values, average RSSI values, etc.) corresponds with the number of WNICs 212-218 of the wireless networking device 104. Thus, since the wireless networking device 104 of FIG. 2 includes four of the WNICs 212-218, the performance determination circuitry 236 determines whether the number of WNIC test results equals four. When the performance determination circuitry 236 determines that there are more of the WNICs 212-218 on which to perform the self-test, then the example instructions and/or operations 306 return to block 404.

When the performance determination circuitry 236 determines that the WNICs 212-218 have been tested, then the example instructions and/or operations 306 proceed to block 408 at which the wireless networking device 104 determines whether all the WNICs 212-218 have been tested at the first and second frequencies (e.g., 2.4 GHz and 5 GHz). For example, the performance determination circuitry 236 can query the storage device(s) 206 to determine, detect, identify, etc. whether the number of WNIC test results corresponds to the number of WNICs of the wireless networking device 104 and the number of frequencies at which the self-test is performed. For example, since the number of the WNICs 212-218 is four, and the self-test of the example wireless networking device 104 is conducted at the first and second frequencies, the performance determination circuitry 236 determines whether the number of WNIC test results equals eight.

When the performance determination circuitry 236 determines that all the WNICs 212-218 of the wireless networking device 104 have not been tested at both the first and the second frequencies (e.g., 2.4 GHz and 5 GHz), then the example instructions and/or operations 306 return to block 404 where the wireless networking device 104 performs the self-test on the next WNIC (e.g., the second, third, or fourth WNIC 214-218) at either the first or second frequency.

When the performance determination circuitry 236 determines that all the WNICs 212-218 of the wireless networking device 104 have been tested at both the first and the second frequencies (e.g., 2.4 GHz and 5 GHZ), then the example instructions and/or operations 306 proceed to block 412 where the wireless networking device 104 determines whether a counter associated with one of the antennas 220-226 of one of the WNICs 212-216 satisfies the second threshold (e.g., a counter threshold). For example, when the antennas 220-226 correspond to sets of four antennas, then the performance determination circuitry 236 can determine whether the counter associated with a first antenna of the first set of antennas 220 satisfies the second threshold. When the performance determination circuitry 236 determines that the counter does not satisfy the second threshold, then the example instruction and/or operations 306 proceed to block 414 where the wireless networking device 104 flags the antenna as defective. For example, the performance determination circuitry 236 can flag and/or label an identifier of the first antenna of the first set of antennas 220 as being defective and include that flag, label, indicator, etc. in the self-test report that is sent to the back office facility 108 at block 308 of FIG. 3.

When the performance determination circuitry 236 determines that the counter does satisfy the second threshold, then the example instruction and/or operations 306 proceed to block 416 where the wireless networking device 104 determines whether there are more antennas included in the WNIC. For example, when the antennas 220-226 correspond to sets of antennas 220-226, then the performance determination circuitry 236 can determine whether the number of counters determined equals the number of antennas in the WNIC being examined. When the performance determination circuitry 236 determines that there are more antennas of the WNIC to examine and/or analyze, then the example instructions and/or operations 306 return to block 412.

When the performance determination circuitry 236 determines that there are not more antennas of the WNIC to examine and/or analyze, then the example instructions and/ or operations 306 proceed to block 418 where the wireless networking device 104 determines whether there are more WNIC(s) of the wireless networking device 104 to analyze. For example, the performance determination circuitry 236 determines whether there are more test results of WNICs 212-218 to analyze, examine, and/or report in the test results. When the performance determination circuitry 236 determines that there is/are more WNICs to analyze, then the example instructions and/or operations 306 return to block 412. Otherwise, the example instructions and/or operations 306 return to block 308 of FIG. 3.

FIG. 5 is a flowchart representative of the example machine readable instructions and/or the example operations 404 that may be executed and/or instantiated by processor circuitry to implement the self-test circuitry 228 of FIG. 2 to perform a self-test of one of the WNICs 212-218 of the wireless networking device 104. Although the example instructions and/or operations 404 are described in reference to performing the self-test on the first WNIC 212, the instructions and/or operations 404 can be performed for any of the WNICs 212-218 integrated into the wireless networking device 104 depending on the stage of the self-test being performed. The machine readable instructions and/or the operations 404 of FIG. 5 begin at block 502, at which the wireless networking device 104 sets the WNIC to a reception and/or "receive-only" mode. For example, the signal configuration circuitry 232 can adjust a setting of the first WNIC 212 to only act as a receiver and not as a transmitter such that the second, third, and fourth WNICs 214-218 can transmit data packets to the first WNIC 212 without the first WNIC 212 obstructing the communication.

At block 504, the wireless networking device 104 transmits data packets from another WNIC. For example the communication controller circuitry 230 can cause the second WNIC 214 to transmit a plurality of data packets (e.g., 50 data packets) to the first WNIC 212.

At block 506, the wireless networking device 104 obtains, collects, gathers, and/or retrieves the data packets via the first antenna(s) 220 of the first WNIC 212. For example, the communication controller circuitry 230 can cause the first WNIC 212 to obtain and/or receive the plurality of data packets via the first antenna 220, or in some examples, the first set of antennas 220.

At block 508, the wireless networking device 104 determines a received signal strength indicator (RSSI) value for each of the first antenna(s) 220 of the first WNIC 212. For example, the signal strength determination circuitry 234 detects, determines, identifies, calculates, and/or processes the RSSI value for the first antenna 220, or in some examples, the first set of antennas 220. The example signal strength determination circuitry 234 determines RSSI values for each antenna of the first antenna(s) 220 and corresponding to each data packet obtained.

At block 510, the wireless networking device 104 determines whether a predetermined number of data packets have been collected by the first WNIC 212 via the first antenna(s) 220. For example, the communication controller circuitry 230 can determine whether the number of data packets logged into the storage devices equals the predetermined value (e.g., 50 data packets). When the communication controller circuitry 230 determines that the predetermined number of data packets have not been obtained, then the example instructions and/or operations 404 return to block 506.

When the communication controller circuitry 230 determines that the predetermined number of data packets have been obtained, then the example instructions and/or operations 404 proceed to block 512 where the wireless networking device 104 calculates an average RSSI value for the first antenna(s) 220. For example, the signal strength determination circuitry 234 calculates, determines, and/or processes the average RSSI value based on the plurality of RSSI values (e.g., 50 RSSI values) determined for the first antenna(s) 220. When the first antenna 220 is the set of antennas 220, then the signal strength determination circuitry 234 determines average RSSI values for each antenna of the first set of antennas 220.

At block 514, the wireless networking device 104 determines whether the average RSSI value of the first antenna(s) satisfy the first threshold. For example, the performance determination circuitry 236 determines whether the average RSSI value(s) of the first antenna(s) 220 is/are greater than the first threshold (e.g., the RSSI threshold). When the performance determination circuitry 236 determines that the average RSSI value does satisfy the threshold, then the example instructions and/or operations 404 proceed to block 518.

When the example performance determination circuitry 236 determines that the average RSSI value does not satisfy the threshold, then the example instructions and/or operations 404 proceed to block 516 where the wireless networking device 104 increments a counter associated with the first antenna 220. For example, the performance determination circuitry 236 adds a value of one to the counter associated with the first antenna(s) 220.

At block 518, the wireless networking device 104 determines whether there are more first antenna(s) 220 of the first WNIC 212 to test. For example, the performance determination circuitry 236 determines whether the number of average RSSI values calculated and/or number of antennas tested matches a number of antennas associated with the first WNIC 212. In some examples, the performance determination circuitry 236 determines whether the number of antennas tested matches a number of antennas in the first set of antennas 220. When the performance determination circuitry 236 determines that there are more antennas of the first WNIC 212 to test, then the example instructions and/or operations 404 return to block 512.

When the performance determination circuitry 236 determines that there are not more antennas of the first WNIC 212 to test, then the example instructions and/or operations 404 proceed to block 520 where the wireless networking device 104 determines whether there are more WNICs from which to transmit data packets. For example, the performance determination circuitry 236 determines whether the second, third, and/or fourth WNICs 214-218 have transmitted data packets to the first WNIC 212 for the current portion of the self-test. When the performance determination circuitry 236 determines that there are more WNICs from which to transmit data packets, then the example instructions and/or operations 404 return to block 504 where the next WNIC (e.g., the second, third, fourth WNIC 214-218, etc.) of the wireless networking device 104 transmits data packets to the first WNIC 212. When the performance determination circuitry 236 determines that there are no more WNIC(s) of the wireless networking device 104 to send data packets to the first WNIC 212, then the example instructions and/or operations 404 return to block 406 of FIG. 4.

Figure 6:
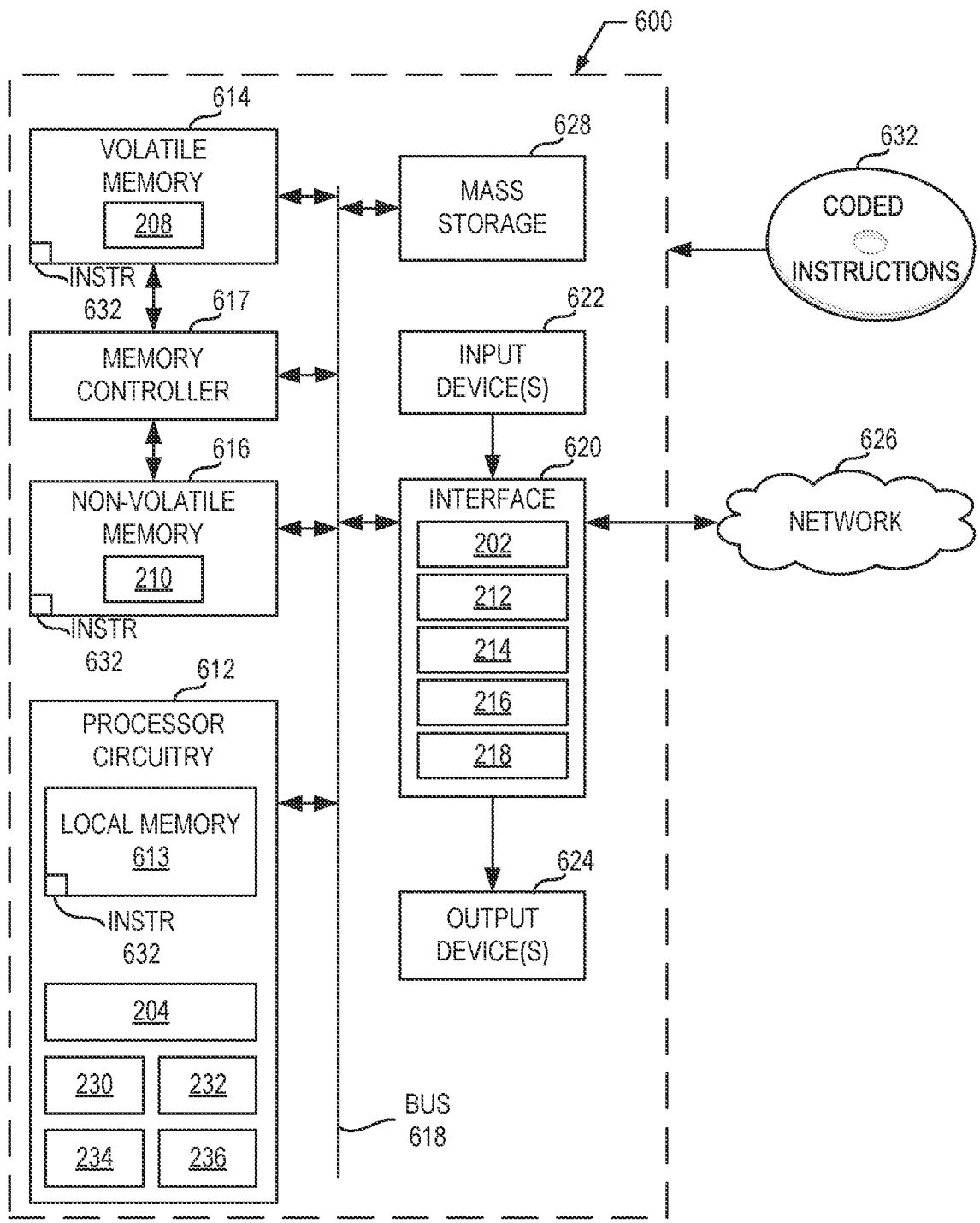
FIG. 6 is a block diagram of an example processing platform including processor circuitry structured to execute the example machine readable instructions and/or the example operations of FIGS. 3-5 to implement the example wireless networking device of FIG. 2.

FIG. 6 is a block diagram of an example processor platform 600 structured to execute and/or instantiate the machine readable instructions and/or the operations of FIGS. 3-5 to implement the wireless networking device 104 of FIG. 2. The processor platform 600 can be, for example, a server, a personal computer, a workstation, a self-learning machine (e.g., a neural network), a mobile device (e.g., a cell phone, a smart phone, a tablet such as an iPad™), an Internet appliance, or any other type of computing device.

The processor platform 600 of the illustrated example includes processor circuitry 612. The processor circuitry 612 of the illustrated example is hardware. For example, the processor circuitry 612 can be implemented by one or more integrated circuits, logic circuits, FPGAs, microprocessors, CPUs, GPUs, DSPs, and/or microcontrollers from any desired family or manufacturer. The processor circuitry 612 may be implemented by one or more semiconductor based (e.g., silicon based) devices. In this example, the processor circuitry 612 implements the example metering circuitry 204, the example communication controller circuitry 230, the example signal configuration circuitry 232, the example signal strength determination circuitry 234, and/or the example performance determination circuitry 236.

The processor circuitry 612 of the illustrated example includes a local memory 613 (e.g., a cache, registers, etc.). The processor circuitry 612 of the illustrated example is in communication with a main memory including a volatile memory 614 and a non-volatile memory 616 by a bus 618. The volatile memory 614 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 616 may be implemented by flash memory and/or any other desired type of memory device. Access to the main memory 614, 616 of the illustrated example is controlled by a memory controller 617.

The processor platform 600 of the illustrated example also includes interface circuitry 620. The interface circuitry 620 includes the interface circuitry 202 and the WNICs 212-218 of FIG. 2. The interface circuitry 620 may be implemented by hardware in accordance with any type of interface standard, such as an Ethernet interface, a universal serial bus (USB) interface, a Bluetooth® interface, a near field communication (NFC) interface, a Peripheral Component Interconnect (PCI) interface, a Peripheral Component Interconnect Express (PCIe) interface, and/or a Wi-Fi card.

In the illustrated example, one or more input devices 622 are connected to the interface circuitry 620. The input device(s) 622 permit(s) a user to enter data and/or commands into the processor circuitry 612. The input device(s) 622 can be implemented by, for example, an audio sensor, a microphone, a camera (still or video), a keyboard, a button, a mouse, a touchscreen, a track-pad, a trackball, an isopoint device, and/or a voice recognition system.

One or more output devices 624 are also connected to the interface circuitry 620 of the illustrated example. The output device(s) 624 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 620 of the illustrated example, thus, typically includes a graphics driver card, a graphics driver chip, and/or graphics processor circuitry such as a GPU.

The interface circuitry 620 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 626. The communication can be by, for example, an Ethernet connection, a digital subscriber line (DSL) connection, a telephone line connection, a coaxial cable system, a satellite system, a line-of-site wireless system, a cellular telephone system, an optical connection, etc.

The processor platform 600 of the illustrated example also includes one or more mass storage devices 628 to store software and/or data. Examples of such mass storage devices 628 include magnetic storage devices, optical storage devices, floppy disk drives, HDDs, CDs, Blu-ray disk drives, redundant array of independent disks (RAID) systems, solid state storage devices such as flash memory devices and/or SSDs, and DVD drives.

The machine readable instructions 632, which may be implemented by the machine readable instructions of FIGS. 3-5, may be stored in the mass storage device 628, in the volatile memory 614, in the non-volatile memory 616, and/or on a removable non-transitory computer readable storage medium such as a CD or DVD.

Figure 7:
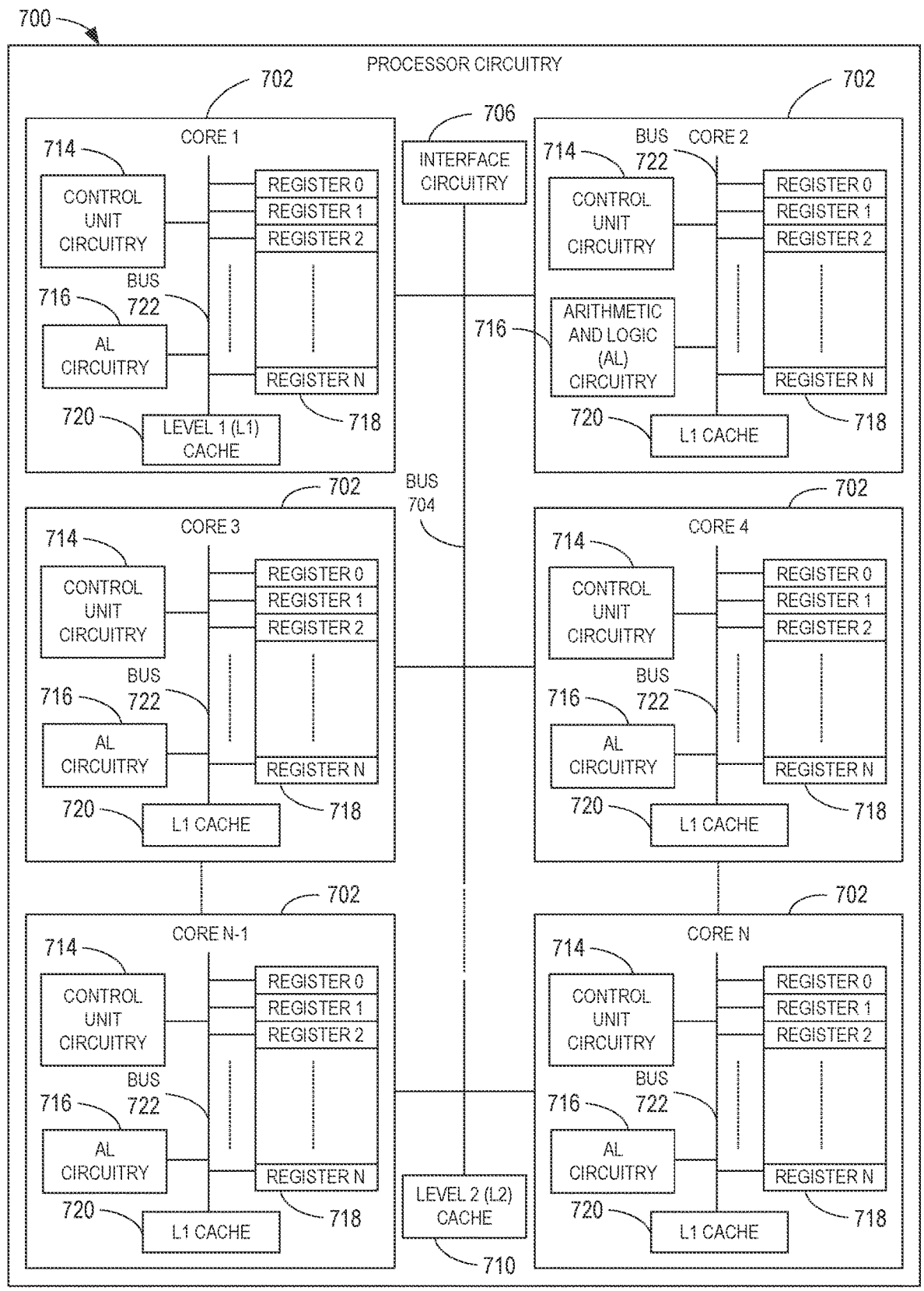
FIG. 7 is a block diagram of an example implementation of the processor circuitry of FIG. 6.

FIG. 7 is a block diagram of an example implementation of the processor circuitry 612 of FIG. 6. In this example, the processor circuitry 612 of FIG. 6 is implemented by a microprocessor 700. For example, the microprocessor 700 may be a general purpose microprocessor (e.g., general purpose microprocessor circuitry). The microprocessor 700 executes some or all of the machine readable instructions of the flowcharts of FIGS. 3-5 to effectively instantiate the circuitry of FIG. 2 as logic circuits to perform the operations corresponding to those machine readable instructions. In some such examples, the circuitry of FIG. 2 is instantiated by the hardware circuits of the microprocessor 700 in combination with the instructions. For example, the microprocessor 700 may be implemented by multi-core hardware circuitry such as a CPU, a DSP, a GPU, an XPU, etc. Although it may include any number of example cores 702 (e.g., 1 core), the microprocessor 700 of this example is a multi-core semiconductor device including N cores. The cores 702 of the microprocessor 700 may operate independently or may cooperate to execute machine readable instructions. For example, machine code corresponding to a firmware program, an embedded software program, or a software program may be executed by one of the cores 702 or may be executed by multiple ones of the cores 702 at the same or different times. In some examples, the machine code corresponding to the firmware program, the embedded software program, or the software program is split into threads and executed in parallel by two or more of the cores 702. The software program may correspond to a portion or all of the machine readable instructions and/or operations represented by the flowcharts of FIGS. 3-5.

The cores 702 may communicate by a first example bus 704. In some examples, the first bus 704 may be implemented by a communication bus to effectuate communication associated with one(s) of the cores 702. For example, the first bus 704 may be implemented by at least one of an Inter-Integrated Circuit (I2C) bus, a Serial Peripheral Interface (SPI) bus, a PCI bus, or a PCIe bus. Additionally or alternatively, the first bus 704 may be implemented by any other type of computing or electrical bus. The cores 702 may obtain data, instructions, and/or signals from one or more external devices by example interface circuitry 706. The cores 702 may output data, instructions, and/or signals to the one or more external devices by the interface circuitry 706. Although the cores 702 of this example include example local memory 720 (e.g., Level 1 (L1) cache that may be split into an L1 data cache and an L1 instruction cache), the microprocessor 700 also includes example shared memory 710 that may be shared by the cores (e.g., Level 2 (L2 cache)) for high-speed access to data and/or instructions. Data and/or instructions may be transferred (e.g., shared) by writing to and/or reading from the shared memory 710. The local memory 720 of each of the cores 702 and the shared memory 710 may be part of a hierarchy of storage devices including multiple levels of cache memory and the main memory (e.g., the main memory 614, 616 of FIG. 6). Typically, higher levels of memory in the hierarchy exhibit lower access time and have smaller storage capacity than lower levels of memory. Changes in the various levels of the cache hierarchy are managed (e.g., coordinated) by a cache coherency policy.

Each core 702 may be referred to as a CPU, DSP, GPU, etc., or any other type of hardware circuitry. Each core 702 includes control unit circuitry 714, arithmetic and logic (AL) circuitry (sometimes referred to as an ALU) 716, a plurality of registers 718, the local memory 720, and a second example bus 722. Other structures may be present. For example, each core 702 may include vector unit circuitry, single instruction multiple data (SIMD) unit circuitry, load/store unit (LSU) circuitry, branch/jump unit circuitry, floating-point unit (FPU) circuitry, etc. The control unit circuitry 714 includes semiconductor-based circuits structured to control (e.g., coordinate) data movement within the corresponding core 702. The AL circuitry 716 includes semiconductor-based circuits structured to perform one or more mathematic and/or logic operations on the data within the corresponding core 702. The AL circuitry 716 of some examples performs integer based operations. In other examples, the AL circuitry 716 also performs floating point operations. In yet other examples, the AL circuitry 716 may include first AL circuitry that performs integer based operations and second AL circuitry that performs floating point operations. In some examples, the AL circuitry 716 may be referred to as an Arithmetic Logic Unit (ALU). The registers 718 are semiconductor-based structures to store data and/or instructions such as results of one or more of the operations performed by the AL circuitry 716 of the corresponding core 702. For example, the registers 718 may include vector register(s), SIMD register(s), general purpose register(s), flag register(s), segment register(s), machine specific register(s), instruction pointer register(s), control register(s), debug register(s), memory management register(s), machine check register(s), etc. The registers 718 may be arranged in a bank as shown in FIG. 7. Alternatively, the registers 718 may be organized in any other arrangement, format, or structure including distributed throughout the core 702 to shorten access time. The second bus 722 may be implemented by at least one of an I2C bus, a SPI bus, a PCI bus, or a PCIe bus Each core 702 and/or, more generally, the microprocessor 700 may include additional and/or alternate structures to those shown and described above. For example, one or more clock circuits, one or more power supplies, one or more power gates, one or more cache home agents (CHAs), one or more converged/common mesh stops (CMSs), one or more shifters (e.g., barrel shifter(s)) and/or other circuitry may be present. The microprocessor 700 is a semiconductor device fabricated to include many transistors interconnected to implement the structures described above in one or more integrated circuits (ICs) contained in one or more packages. The processor circuitry may include and/or cooperate with one or more accelerators. In some examples, accelerators are implemented by logic circuitry to perform certain tasks more quickly and/or efficiently than can be done by a general purpose processor. Examples of accelerators include ASICs and FPGAs such as those discussed herein. A GPU or other programmable device can also be an accelerator. Accelerators may be on-board the processor circuitry, in the same chip package as the processor circuitry and/or in one or more separate packages from the processor circuitry.

Figure 8:
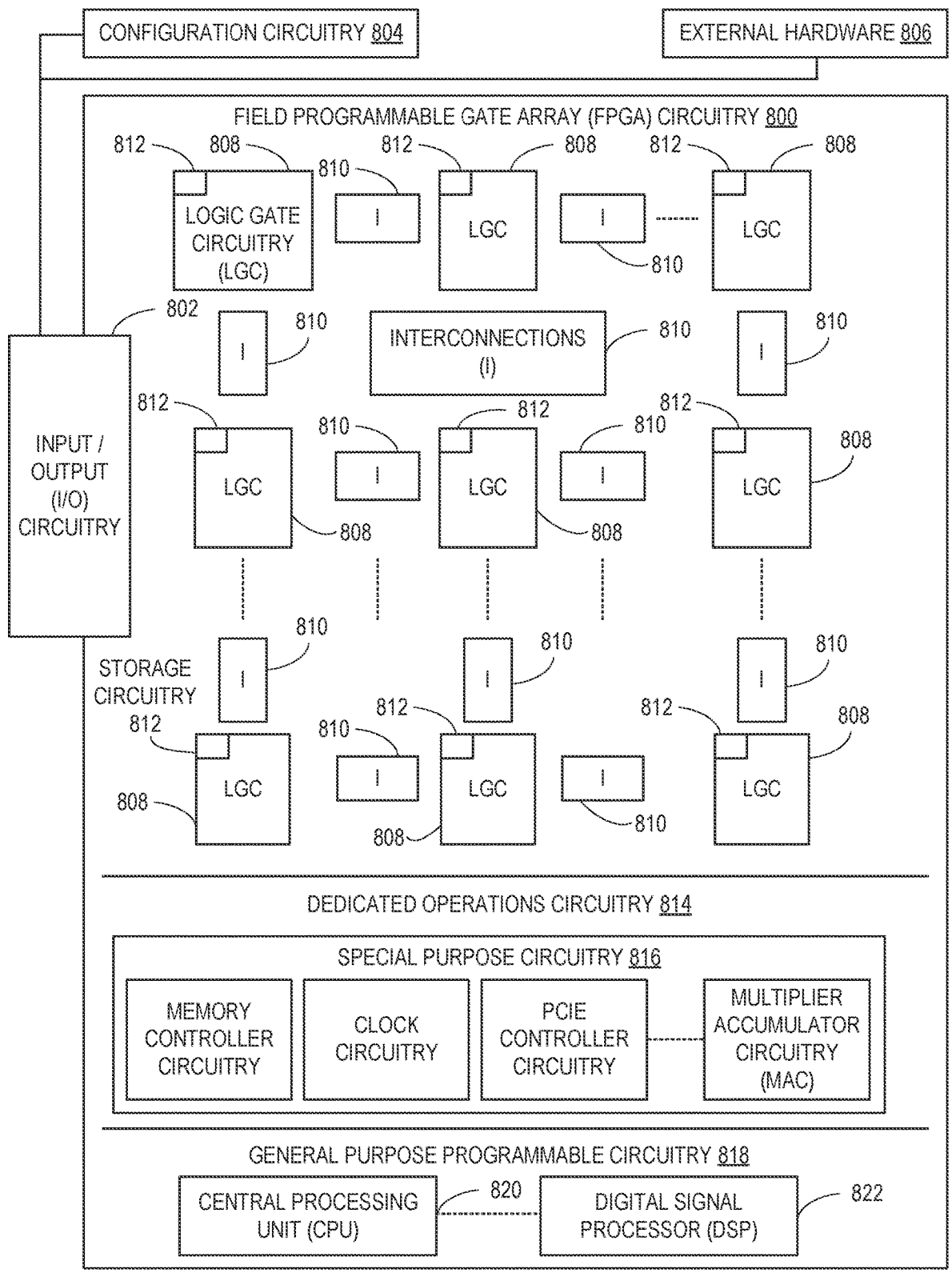
FIG. 8 is a block diagram of another example implementation of the processor circuitry of FIG. 6.

FIG. 8 is a block diagram of another example implementation of the processor circuitry 612 of FIG. 6. In this example, the processor circuitry 612 is implemented by FPGA circuitry 800. For example, the FPGA circuitry 800 may be implemented by an FPGA. The FPGA circuitry 800 can be used, for example, to perform operations that could otherwise be performed by the example microprocessor 700 of FIG. 7 executing corresponding machine readable instructions. However, once configured, the FPGA circuitry 800 instantiates the machine readable instructions in hardware and, thus, can often execute the operations faster than they could be performed by a general purpose microprocessor executing the corresponding software.

More specifically, in contrast to the microprocessor 700 of FIG. 7 described above (which is a general purpose device that may be programmed to execute some or all of the machine readable instructions represented by the flowcharts of FIGS. 3-5 but whose interconnections and logic circuitry are fixed once fabricated), the FPGA circuitry 800 of the example of FIG. 8 includes interconnections and logic circuitry that may be configured and/or interconnected in different ways after fabrication to instantiate, for example, some or all of the machine readable instructions represented by the flowcharts of FIGS. 3-5. In particular, the FPGA circuitry 800 may be thought of as an array of logic gates, interconnections, and switches. The switches can be programmed to change how the logic gates are interconnected by the interconnections, effectively forming one or more dedicated logic circuits (unless and until the FPGA circuitry 800 is reprogrammed). The configured logic circuits enable the logic gates to cooperate in different ways to perform different operations on data received by input circuitry. Those operations may correspond to some or all of the software represented by the flowcharts of FIGS. 3-5. As such, the FPGA circuitry 800 may be structured to effectively instantiate some or all of the machine readable instructions of the flowcharts of FIGS. 3-5 as dedicated logic circuits to perform the operations corresponding to those software instructions in a dedicated manner analogous to an ASIC. Therefore, the FPGA circuitry 800 may perform the operations corresponding to the some or all of the machine readable instructions of FIGS. 3-5 faster than the general purpose microprocessor can execute the same.

In the example of FIG. 8, the FPGA circuitry 800 is structured to be programmed (and/or reprogrammed one or more times) by an end user by a hardware description language (HDL) such as Verilog. The FPGA circuitry 800 of FIG. 8, includes example input/output (I/O) circuitry 802 to obtain and/or output data to/from example configuration circuitry 804 and/or external hardware 806. For example, the configuration circuitry 804 may be implemented by interface circuitry that may obtain machine readable instructions to configure the FPGA circuitry 800, or portion(s) thereof. In some such examples, the configuration circuitry 804 may obtain the machine readable instructions from a user, a machine (e.g., hardware circuitry (e.g., programmed or dedicated circuitry) that may implement an Artificial Intelligence/Machine Learning (AI/ML) model to generate the instructions), etc. In some examples, the external hardware 806 may be implemented by external hardware circuitry. For example, the external hardware 806 may be implemented by the microprocessor 700 of FIG. 7. The FPGA circuitry 800 also includes an array of example logic gate circuitry 808, a plurality of example configurable interconnections 810, and example storage circuitry 812. The logic gate circuitry 808 and the configurable interconnections 810 are configurable to instantiate one or more operations that may correspond to at least some of the machine readable instructions of FIGS. 3-5 and/or other desired operations. The logic gate circuitry 808 shown in FIG. 8 is fabricated in groups or blocks. Each block includes semiconductor-based electrical structures that may be configured into logic circuits. In some examples, the electrical structures include logic gates (e.g., And gates, Or gates, Nor gates, etc.) that provide basic building blocks for logic circuits. Electrically controllable switches (e.g., transistors) are present within each of the logic gate circuitry 808 to enable configuration of the electrical structures and/or the logic gates to form circuits to perform desired operations. The logic gate circuitry 808 may include other electrical structures such as look-up tables (LUTs), registers (e.g., flip-flops or latches), multiplexers, etc.

The configurable interconnections 810 of the illustrated example are conductive pathways, traces, vias, or the like that may include electrically controllable switches (e.g., transistors) whose state can be changed by programming (e.g., using an HDL instruction language) to activate or deactivate one or more connections between one or more of the logic gate circuitry 808 to program desired logic circuits.

The storage circuitry 812 of the illustrated example is structured to store result(s) of the one or more of the operations performed by corresponding logic gates. The storage circuitry 812 may be implemented by registers or the like. In the illustrated example, the storage circuitry 812 is distributed amongst the logic gate circuitry 808 to facilitate access and increase execution speed.

The example FPGA circuitry 800 of FIG. 8 also includes example Dedicated Operations Circuitry 814. In this example, the Dedicated Operations Circuitry 814 includes special purpose circuitry 816 that may be invoked to implement commonly used functions to avoid the need to program those functions in the field. Examples of such special purpose circuitry 816 include memory (e.g., DRAM) controller circuitry, PCIe controller circuitry, clock circuitry, transceiver circuitry, memory, and multiplier-accumulator circuitry. Other types of special purpose circuitry may be present. In some examples, the FPGA circuitry 800 may also include example general purpose programmable circuitry 818 such as an example CPU 820 and/or an example DSP 822. Other general purpose programmable circuitry 818 may additionally or alternatively be present such as a GPU, an XPU, etc., that can be programmed to perform other operations.

Although FIGS. 7 and 8 illustrate two example implementations of the processor circuitry 612 of FIG. 6, many other approaches are contemplated. For example, as mentioned above, modern FPGA circuitry may include an on-board CPU, such as one or more of the example CPU 820 of FIG. 8. Therefore, the processor circuitry 612 of FIG. 6 may additionally be implemented by combining the example microprocessor 700 of FIG. 7 and the example FPGA circuitry 800 of FIG. 8. In some such hybrid examples, a first portion of the machine readable instructions represented by the flowcharts of FIGS. 3-5 may be executed by one or more of the cores 702 of FIG. 7, a second portion of the machine readable instructions represented by the flowcharts of FIGS. 3-5 may be executed by the FPGA circuitry 800 of FIG. 8, and/or a third portion of the machine readable instructions represented by the flowcharts of FIGS. 3-5 may be executed by an ASIC. It should be understood that some or all of the circuitry of FIG. 2 may, thus, be instantiated at the same or different times. Some or all of the circuitry may be instantiated, for example, in one or more threads executing concurrently and/or in series. Moreover, in some examples, some or all of the circuitry of FIG. 2 may be implemented within one or more virtual machines and/or containers executing on the microprocessor.

In some examples, the processor circuitry 612 of FIG. 6 may be in one or more packages. For example, the microprocessor 700 of FIG. 7 and/or the FPGA circuitry 800 of FIG. 8 may be in one or more packages. In some examples, an XPU may be implemented by the processor circuitry 612 of FIG. 6, which may be in one or more packages. For example, the XPU may include a CPU in one package, a DSP in another package, a GPU in yet another package, and an FPGA in still yet another package.

Figure 9:
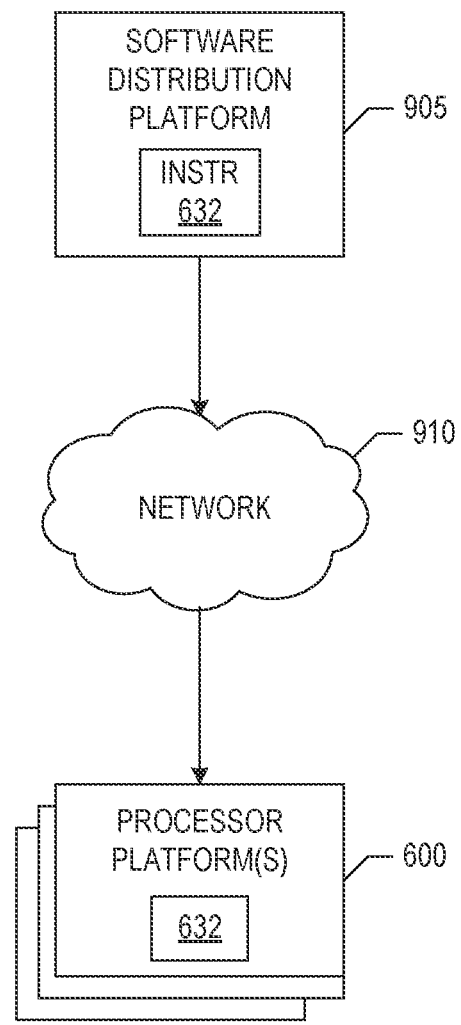
FIG. 9 is a block diagram of an example software distribution platform (e.g., one or more servers) to distribute software (e.g., software corresponding to the example machine readable instructions of FIGS. 3-5) to client devices associated with end users and/or consumers (e.g., for license, sale, and/or use), retailers (e.g., for sale, re-sale, license, and/or sub-license), and/or original equipment manufacturers (OEMs) (e.g., for inclusion in products to be distributed to, for example, retailers and/or to other end users such as direct buy customers).

A block diagram illustrating an example software distribution platform 905 to distribute software such as the example machine readable instructions 632 of FIG. 6 to hardware devices owned and/or operated by third parties is illustrated in FIG. 9. The example software distribution platform 905 may be implemented by any computer server, data facility, cloud service, etc., capable of storing and transmitting software to other computing devices. The third parties may be customers of the entity owning and/or operating the software distribution platform 905. For example, the entity that owns and/or operates the software distribution platform 905 may be a developer, a seller, and/or a licensor of software such as the example machine readable instructions 632 of FIG. 6. The third parties may be consumers, users, retailers, OEMs, etc., who purchase and/or license the software for use and/or re-sale and/or sub-licensing. In the illustrated example, the software distribution platform 905 includes one or more servers and one or more storage devices. The storage devices store the machine readable instructions 632, which may correspond to the example machine readable instructions 300, 306, and 404 of FIGS. 3-5, as described above. The one or more servers of the example software distribution platform 905 are in communication with an example network 910, which may correspond to any one or more of the Internet and/or any of the example networks 106 described above. In some examples, the one or more servers are responsive to requests to transmit the software to a requesting party as part of a commercial transaction. Payment for the delivery, sale, and/or license of the software may be handled by the one or more servers of the software distribution platform and/or by a third party payment entity. The servers enable purchasers and/or licensors to download the machine readable instructions 632 from the software distribution platform 905. For example, the software, which may correspond to the example machine readable instructions 300, 306, 404 of FIGS. 3-5, may be downloaded to the example processor platform 600, which is to execute the machine readable instructions 632 to implement the wireless networking device 104. In some examples, one or more servers of the software distribution platform 905 periodically offer, transmit, and/or force updates to the software (e.g., the example machine readable instructions 632 of FIG. 6) to ensure improvements, patches, updates, etc., are distributed and applied to the software at the end user devices.

From the foregoing, it will be appreciated that example systems, methods, apparatus, and articles of manufacture have been disclosed that perform self-tests on wireless networking device(s) 104. Disclosed systems, methods, apparatus, and articles of manufacture improve the efficiency of using a computing device by enabling the wireless networking device 104 to test the electromagnetic communication components (e.g., the WNICs 212-218 and the antennas 220-226) for defects without having to use an external device, a specialized room (e.g., "radio quiet" room), and/or otherwise spend extra time obtaining and/or shipping the wireless networking device 104 to operate the test. Disclosed systems, methods, apparatus, and articles of manufacture are accordingly directed to one or more improvement(s) in the operation of a machine such as a computer or other electronic and/or mechanical device.

Example methods, apparatus, systems, and articles of manufacture to perform a self-test on a wireless networking device (e.g., a streaming meter, a wireless router, a wireless adapter, a wireless phone, etc.) are disclosed herein. Further examples and combinations thereof include the following:

Example 1 includes an apparatus to perform a wireless device self-test, the apparatus comprising a first wireless network interface controller (WNIC), and processor circuitry including one or more of at least one of a central processor unit, a graphics processor unit, or a digital signal processor, the at least one of the central processor unit, the graphics processor unit, or the digital signal processor having control circuitry to control data movement within the processor circuitry, arithmetic and logic circuitry to perform one or more first operations corresponding to instructions, and one or more registers to store a result of the one or more first operations, the instructions in the apparatus, a Field Programmable Gate Array (FPGA), the FPGA including logic gate circuitry, a plurality of configurable interconnections, and storage circuitry, the logic gate circuitry and the plurality of the configurable interconnections to perform one or more second operations, the storage circuitry to store a result of the one or more second operations, or Application Specific Integrated Circuitry (ASIC) including logic gate circuitry to perform one or more third operations, the processor circuitry to perform at least one of the first operations, the second operations, or the third operations to instantiate communication controller circuitry to cause the first WNIC to obtain a plurality of data packets from a second WNIC at a frequency, signal strength determination circuitry to determine a received signal strength indicator (RSSI) value for an antenna of the first WNIC, and performance determination circuitry to increment a counter associated with the antenna when the RSSI value does not satisfy a first threshold, and report an error associated with the antenna to a back office facility when the counter associated with the antenna does not satisfy a second threshold.

Example 2 includes the apparatus of example 1, wherein the first and second thresholds are obtained from the back office facility.

Example 3 includes the apparatus of example 1, further including signal configuration circuitry to program the second WNIC to send the data packets over the frequency.

Example 4 includes the apparatus of example 1, wherein the signal strength determination circuitry is to determine the RSSI value based on an average of RSSI values corresponding to the plurality of data packets.

Example 5 includes the apparatus of example 1, wherein the apparatus includes the first and second WNICs, a third WNIC, and a fourth WNIC, and wherein the first, second, third, and fourth WNICs include sets of four antennas.

Example 6 includes the apparatus of example 5, wherein the plurality of data packets is a first plurality of data packets, and the communication controller circuitry is to cause the first WNIC to obtain a second plurality of data packets from the third WNIC at the frequency, and cause the first WNIC to obtain a third plurality of data packets from the fourth WNIC at the frequency.

Example 7 includes the apparatus of example 6, wherein the RSSI value is a first RSSI value, and the performance determination circuitry is to determine a second RSSI value corresponding to the second plurality of data packets, and determine a third RSSI value corresponding to the third plurality of data packets.

Example 8 includes the apparatus of example 7, wherein the frequency is a first frequency, and the communication controller circuitry is to cause the first WNIC to obtain a fourth plurality of data packets from the second WNIC at a second frequency, cause the first WNIC to obtain a fifth plurality of data packets from the third WNIC at the second frequency, and cause the first WNIC to obtain a sixth plurality of data packets from the fourth WNIC at the second frequency.

Example 9 includes the apparatus of example 8, wherein the second threshold corresponds to half of a total number of RSSI values determined for the antenna, the total number of RSSI values corresponding to the first and second frequencies.

Example 10 includes an apparatus to perform a wireless device self-test, the apparatus comprising a first wireless network interface controller (WNIC), at least one memory, machine readable instructions, and processor circuitry to at least one of instantiate or execute the machine readable instructions to cause the first WNIC to collect a plurality of data packets from a second WNIC at a frequency, calculate a received signal strength indicator (RSSI) value for an antenna of the first WNIC, increase a counter associated with the antenna when the RSSI value does not satisfy a first threshold, and indicate an error associated with the antenna to a back office facility when the counter associated with the antenna does not satisfy a second threshold.

Example 11 includes the apparatus of example 10, wherein the first and second thresholds are obtained from the back office facility.

Example 12 includes the apparatus of example 10, wherein the processor circuitry is to set the second WNIC to send the data packets over the frequency.

Example 13 includes the apparatus of example 10, wherein the processor circuitry is to calculate the RSSI value based on an average of RSSI values corresponding to the plurality of data packets.

Example 14 includes the apparatus of example 10, wherein the apparatus includes the first and second WNICs, a third WNIC, and a fourth WNIC, and wherein the first, second, third, and fourth WNICs include sets of four antennas.

Example 15 includes the apparatus of example 14, wherein the plurality of data packets is a first plurality of data packets, and the processor circuitry is to cause the first WNIC to obtain a second plurality of data packets from the third WNIC at the frequency, and cause the first WNIC to obtain a third plurality of data packets from the fourth WNIC at the frequency.

Example 16 includes the apparatus of example 15, wherein the RSSI value is a first RSSI value, and the processor circuitry is to calculate a second RSSI value corresponding to the second plurality of data packets, and calculate a third RSSI value corresponding to the third plurality of data packets.

Example 17 includes the apparatus of example 16, wherein the frequency is a first frequency, and the processor circuitry is to cause the first WNIC to obtain a fourth plurality of data packets from the second WNIC at a second frequency, cause the first WNIC to obtain a fifth plurality of data packets from the third WNIC at the second frequency, and cause the first WNIC to obtain a sixth plurality of data packets from the fourth WNIC at the second frequency.

Example 18 includes the apparatus of example 17, wherein the second threshold corresponds to half of a total number of RSSI values calculated for the antenna, the total number of RSSI values corresponding to the first and second frequencies.

Example 19 includes a non-transitory machine readable storage medium comprising instructions that, when executed, cause processor circuitry to at least cause a first WNIC to retrieve a plurality of data packets from a second WNIC at a frequency, process a received signal strength indicator (RSSI) value for an antenna of the first WNIC, increment a counter associated with the antenna when the RSSI value does not satisfy a first threshold, and communicate an error associated with the antenna to a back office facility when the counter associated with the antenna does not satisfy a second threshold.

Example 20 includes the non-transitory machine readable storage medium of example 19, wherein the first and second thresholds are obtained from the back office facility.

Example 21 includes the non-transitory machine readable storage medium of example 19, wherein the instructions, when executed, cause the processor circuitry to configure the second WNIC to send the data packets over the frequency.

Example 22 includes the non-transitory machine readable storage medium of example 19, wherein the instructions, when executed, cause the processor circuitry to process the RSSI value based on an average of RSSI values corresponding to the plurality of data packets.

Example 23 includes the non-transitory machine readable storage medium of example 19, wherein the plurality of data packets is a first plurality of data packets, and the instructions, when executed, cause the processor circuitry to cause the first WNIC to obtain a second plurality of data packets from a third WNIC at the frequency, and cause the first WNIC to obtain a third plurality of data packets from a fourth WNIC at the frequency.

Example 24 includes the non-transitory machine readable storage medium of example 23, wherein the RSSI value is a first RSSI value, and the instructions, when executed, cause the processor circuitry to process a second RSSI value corresponding to the second plurality of data packets, and process a third RSSI value corresponding to the third plurality of data packets.

Example 25 includes the non-transitory machine readable storage medium of example 24, wherein the frequency is a first frequency, and the instructions, when execute, cause the processor circuitry to cause the first WNIC to retrieve a fourth plurality of data packets from the second WNIC at a second frequency, cause the first WNIC to retrieve a fifth plurality of data packets from the third WNIC at the second frequency, and cause the first WNIC to retrieve a sixth plurality of data packets from the fourth WNIC at the second frequency.

Example 26 includes the non-transitory machine readable storage medium of example 25, wherein the second threshold corresponds to half of a total number of RSSI values calculated for the antenna, the total number of RSSI values corresponding to the first and second frequencies.

Example 27 includes a method comprising causing a first WNIC to gather a plurality of data packets from a second WNIC at a frequency, determining a received signal strength indicator (RSSI) value for an antenna of the first WNIC, incrementing a counter associated with the antenna when the RSSI value does not satisfy a first threshold, and reporting an error associated with the antenna to a back office facility when the counter associated with the antenna does not satisfy a second threshold.

Example 28 includes the method of example 27, wherein the first and second thresholds are obtained from the back office facility.

Example 29 includes the method of example 27, further including adjusting the second WNIC to send the data packets over the frequency.

Example 30 includes the method of example 27, wherein the determining of the RSSI value includes determining the RSSI value based on an average of RSSI values corresponding to the plurality of data packets.

Example 31 includes the method of example 27, wherein the plurality of data packets is a first plurality of data packets, and the causing of the first WNIC to gather includes causing the first WNIC to gather a second plurality of data packets from a third WNIC at the frequency, and causing the first WNIC to gather a third plurality of data packets from a fourth WNIC at the frequency.

Example 32 includes the method of example 31, wherein the RSSI value is a first RSSI value, and the determining of the RSSI value includes determining a second RSSI value corresponding to the second plurality of data packets, and determining a third RSSI value corresponding to the third plurality of data packets.

Example 33 includes the method of example 32, wherein the frequency is a first frequency, and the causing of the first WNIC to gather includes causing the first WNIC to gather a fourth plurality of data packets from the second WNIC at a second frequency, causing the first WNIC to gather a fifth plurality of data packets from the third WNIC at the second frequency, and causing the first WNIC to gather a sixth plurality of data packets from the fourth WNIC at the second frequency.

Example 34 includes the method of example 33, wherein the second threshold corresponds to half of a total number of RSSI values calculated for the antenna, the total number of RSSI values corresponding to the first and second frequencies.

The following claims are hereby incorporated into this Detailed Description by this reference. Although certain example systems, methods, apparatus, and articles of manufacture have been disclosed herein, the scope of coverage of this patent is not limited thereto. On the contrary, this patent covers all systems, methods, apparatus, and articles of manufacture fairly falling within the scope of the claims of this patent.

What is claimed is:

1. An apparatus to perform a wireless device self-test, the apparatus comprising:
 a first wireless network interface controller (WNIC);
 a processor; and
 a non-transitory computer-readable storage medium, having stored thereon program instructions that, upon execution by the processor, cause performance of a set of operations comprising:
  causing the first WNIC to obtain a plurality of data packets from a second WNIC at a frequency;
  determining a received signal strength indicator (RSSI) value for an antenna of the first WNIC, wherein the determining of the RSSI value is based on an average of RSSI values corresponding to the plurality of data packets;
  incrementing a counter associated with the antenna when the RSSI value does not satisfy a first threshold; and
  reporting an error associated with the antenna to a back office server when the counter associated with the antenna does not satisfy a second threshold.

2. The apparatus of claim 1, wherein the first and second thresholds are obtained from the back office server.

3. The apparatus of claim 1, the set of operations further comprising:
 programming the second WNIC to send the data packets over the frequency.

4. The apparatus of claim 1, wherein the apparatus includes the first and second WNICs, a third WNIC, and a fourth WNIC, and wherein the first, second, third, and fourth WNICs include sets of four antennas.

5. The apparatus of claim 4, wherein the plurality of data packets is a first plurality of data packets, and the set of operations further comprises:
 causing the first WNIC to obtain a second plurality of data packets from the third WNIC at the frequency; and
 causing the first WNIC to obtain a third plurality of data packets from the fourth WNIC at the frequency.

6. The apparatus of claim 5, wherein the RSSI value is a first RSSI value, and the set of operations further comprises:
 determining a second RSSI value corresponding to the second plurality of data packets; and
 determining a third RSSI value corresponding to the third plurality of data packets.

7. The apparatus of claim 6, wherein the frequency is a first frequency, and the set of operations further comprises:
 causing the first WNIC to obtain a fourth plurality of data packets from the second WNIC at a second frequency;
 causing the first WNIC to obtain a fifth plurality of data packets from the third WNIC at the second frequency; and
 causing the first WNIC to obtain a sixth plurality of data packets from the fourth WNIC at the second frequency.

8. The apparatus of claim 7, wherein the second threshold corresponds to half of a total number of RSSI values determined for the antenna, the total number of RSSI values corresponding to the first and second frequencies.

9. A non-transitory computer-readable storage medium, having stored thereon program instructions that, upon execution by a processor, cause performance of a set of operations comprising:
 causing a first wireless network interface controller (WNIC) to retrieve a plurality of data packets from a second WNIC at a frequency;
 processing a received signal strength indicator (RSSI) value for an antenna of the first WNIC, wherein the processing of the RSSI value is based on an average of RSSI values corresponding to the plurality of data packets;
 incrementing a counter associated with the antenna when the RSSI value does not satisfy a first threshold; and
 communicating an error associated with the antenna to a back office server when the counter associated with the antenna does not satisfy a second threshold.

10. The non-transitory computer-readable storage medium of claim 9, wherein the plurality of data packets is a first plurality of data packets, and the set of operations further comprise:
 causing the first WNIC to obtain a second plurality of data packets from a third WNIC at the frequency; and
 causing the first WNIC to obtain a third plurality of data packets from a fourth WNIC at the frequency.

11. The non-transitory computer-readable storage medium of claim 10, wherein the RSSI value is a first RSSI value, and the set of operations further comprise:
 processing a second RSSI value corresponding to the second plurality of data packets; and
 processing a third RSSI value corresponding to the third plurality of data packets.

12. The non-transitory computer-readable storage medium of claim 11, wherein the frequency is a first frequency, and the set of operations further comprise:
 causing the first WNIC to retrieve a fourth plurality of data packets from the second WNIC at a second frequency;
 causing the first WNIC to retrieve a fifth plurality of data packets from the third WNIC at the second frequency; and causing the first WNIC to retrieve a sixth plurality of data packets from the fourth WNIC at the second frequency.

13. The non-transitory computer-readable storage medium of claim 12, wherein the second threshold corresponds to half of a total number of RSSI values calculated for the antenna, the total number of RSSI values corresponding to the first and second frequencies.

14. A method comprising:
causing a first wireless network interface controller (WNIC) to gather a plurality of data packets from a second WNIC at a frequency;
determining a received signal strength indicator (RSSI) value for an antenna of the first WNIC, wherein the determining of the RSSI value is based on an average of RSSI values corresponding to the plurality of data packets;
incrementing a counter associated with the antenna when the RSSI value does not satisfy a first threshold; and
reporting an error associated with the antenna to a back office server when the counter associated with the antenna does not satisfy a second threshold.

15. The method of claim 14, wherein the plurality of data packets is a first plurality of data packets, and the causing of the first WNIC to gather comprises:
causing the first WNIC to gather a second plurality of data packets from a third WNIC at the frequency; and
causing the first WNIC to gather a third plurality of data packets from a fourth WNIC at the frequency.

16. The method of claim 15, wherein the RSSI value is a first RSSI value, and the determining of the RSSI value comprises:
determining a second RSSI value corresponding to the second plurality of data packets; and
determining a third RSSI value corresponding to the third plurality of data packets.

17. The method of claim 16, wherein the frequency is a first frequency, and the causing of the first WNIC to gather comprises:
causing the first WNIC to gather a fourth plurality of data packets from the second WNIC at a second frequency;
causing the first WNIC to gather a fifth plurality of data packets from the third WNIC at the second frequency; and
causing the first WNIC to gather a sixth plurality of data packets from the fourth WNIC at the second frequency.

18. The method of claim 17, wherein the second threshold corresponds to half of a total number of RSSI values calculated for the antenna, the total number of RSSI values corresponding to the first and second frequencies.

* * * * *